US012776337B2

(12) United States Patent
Eleftheriou et al.

(10) Patent No.: US 12,776,337 B2
(45) **Date of Patent: *Oct. 27, 2026**

(54) METHOD FOR PREDICTING RISK OF RELAPSE OR ONSET OF A PSYCHIATRIC CONDITION

(71) Applicant: IQVIA Inc., Parsippany, NJ (US)

(72) Inventors: Georgios Eleftheriou, San Francisco, CA (US); Panagiotis Fatouros, Athens (GR); Charalampos Tsirmpas, San Francisco, CA (US)

(73) Assignee: IQVIA Inc., Parsippany, NJ (US)

( * ) Notice: Subject to any disclaimer, the term of this patent is extended or adjusted under 35 U.S.C. 154(b) by 261 days.

This patent is subject to a terminal disclaimer.

(21) Appl. No.: 18/610,154

(22) Filed: Mar. 19, 2024

(65) Prior Publication Data

US 2024/0371398 A1 Nov. 7, 2024

Related U.S. Application Data

(63) Continuation-in-part of application No. 18/235,510, filed on Aug. 18, 2023, and a continuation-in-part of application No. 17/861,158, filed on Jul. 8, 2022, now Pat. No. 11,967,339, which is a continuation of application No. 16/460,105, filed on Jul. 2, 2019, now Pat. No. 11,410,682, which is a continuation-in-part of application No. 15/648,730, filed on Jul. 13, 2017, now abandoned.

(Continued)

(51) Int. Cl.

| | |
|---|---|
| ***G10L 25/00*** | (2013.01) |
| ***G06F 11/32*** | (2006.01) |
| ***G06V 40/20*** | (2022.01) |
| ***G10L 25/63*** | (2013.01) |

(52) U.S. Cl.

CPC ............ *G10L 25/63* (2013.01); *G06F 11/327* (2013.01); *G06V 40/20* (2022.01)

(58) Field of Classification Search

CPC ....... G10L 25/63; G06F 11/327; G06V 40/20; A61B 5/4803

See application file for complete search history.

(56) References Cited

U.S. PATENT DOCUMENTS

| | | | | |
|---|---|---|---|---|
| 9,788,777 | B1 * | 10/2017 | Knight | G06Q 30/0269 |
| 2018/0042542 | A1 * | 2/2018 | Cronin | A61B 5/4803 |

* cited by examiner

*Primary Examiner* — Sana Sahand

(74) *Attorney, Agent, or Firm* — ALG Intellectual Property, LLC

(57) ABSTRACT

A method includes, for each user in a population: audio recording the user reciting a story configured to elicit an emotion associated with a psychiatric condition; concurrently recording a set of biosignals of the user; generating a set of psychophysiological markers correlating instances of the emotion and the set of biosignals; assessing a clinical assessment for the condition in the user; correlating the set of psychophysiological markers and the clinical assessment; and compiling the correlations into a model configured to predict risk of condition onset in a user. The method also includes: accessing a series of biosignals of a first user; identifying a series of psychophysiological markers in the series of biosignals; based on the series of psychophysiological markers and the model, calculating a risk of onset of the condition in the first user; and, in response to the risk exceeding a threshold, serving the notification to the first user.

20 Claims, 12 Drawing Sheets

Related U.S. Application Data

(60) Provisional application No. 63/398,983, filed on Aug. 18, 2022, provisional application No. 62/361,808, filed on Jul. 13, 2016.

METHOD FOR PREDICTING RISK OF RELAPSE OR ONSET OF A PSYCHIATRIC CONDITION

CROSS-REFERENCE TO RELATED APPLICATIONS

This Application is a continuation-in-part application of U.S. patent application Ser. No. 18/235,510, filed on 18 Aug. 2023, which claims benefit of a U.S. Provisional Application No. 63/398,983, filed on 18 Aug. 2022, of each of which is incorporated in its entirety by this reference.

This Application is also a continuation-in-part application of U.S. patent application Ser. No. 17/861,158, filed on 8 Jul. 2022, which is a continuation application of U.S. patent application Ser. No. 16/460,105, filed on 2 Jul. 2019, which is a continuation-in-part of U.S. patent application Ser. No. 15/648,730, filed on 13 Jul. 2017, which claims the benefit of U.S. Provisional Application No. 62/361,808, filed on 13 Jul. 2016, each of which is incorporated in its entirety by this reference.

TECHNICAL FIELD

This invention relates generally to the field of biosensors and more specifically to a new and useful method for detecting and monitoring biomarkers of psychiatric conditions and associated emotions in the field of biosensors.

DESCRIPTION OF THE EMBODIMENTS

Figure 1:
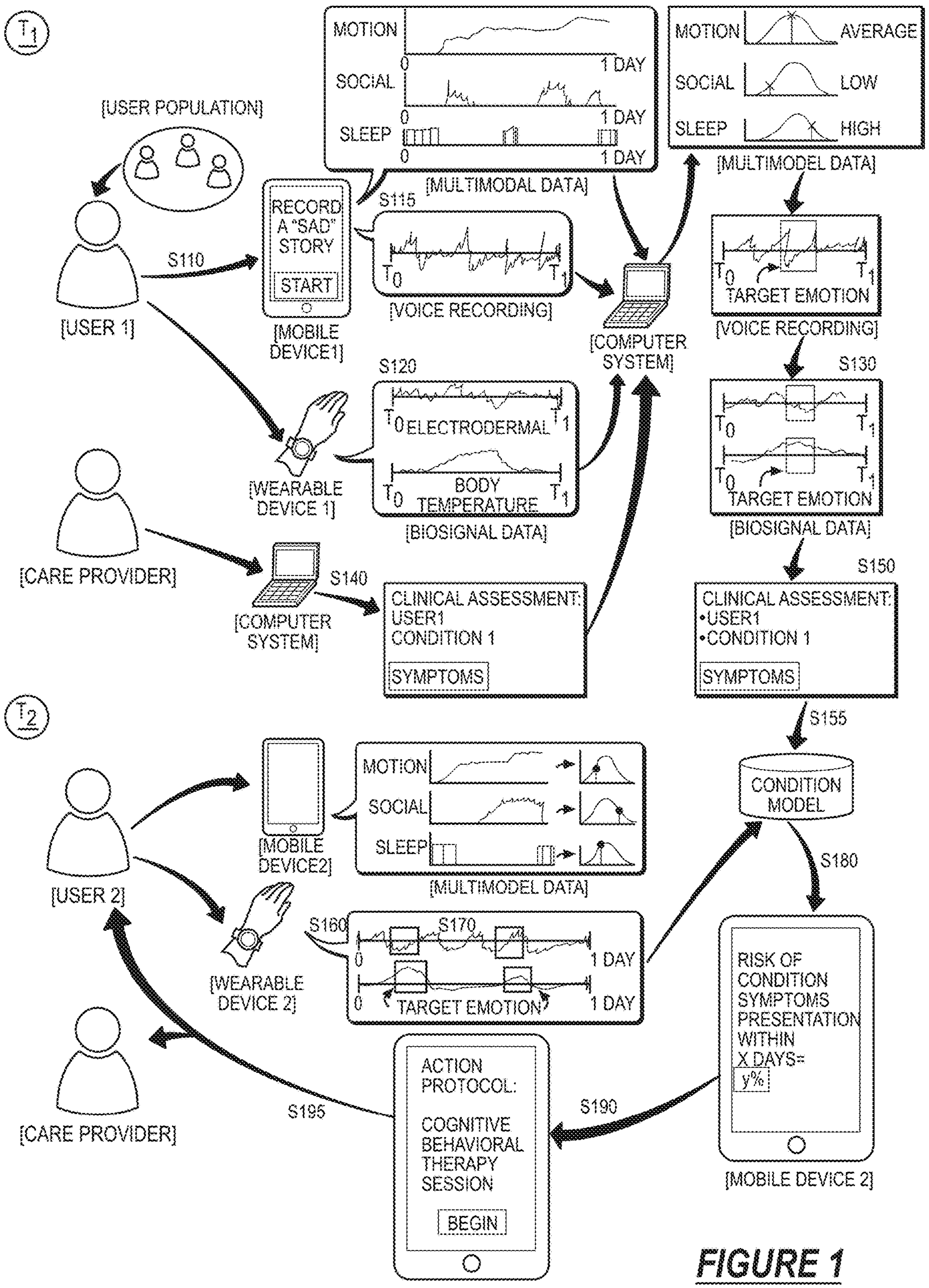
FIG. 1 is a flowchart representation of a method.
Figure 2:
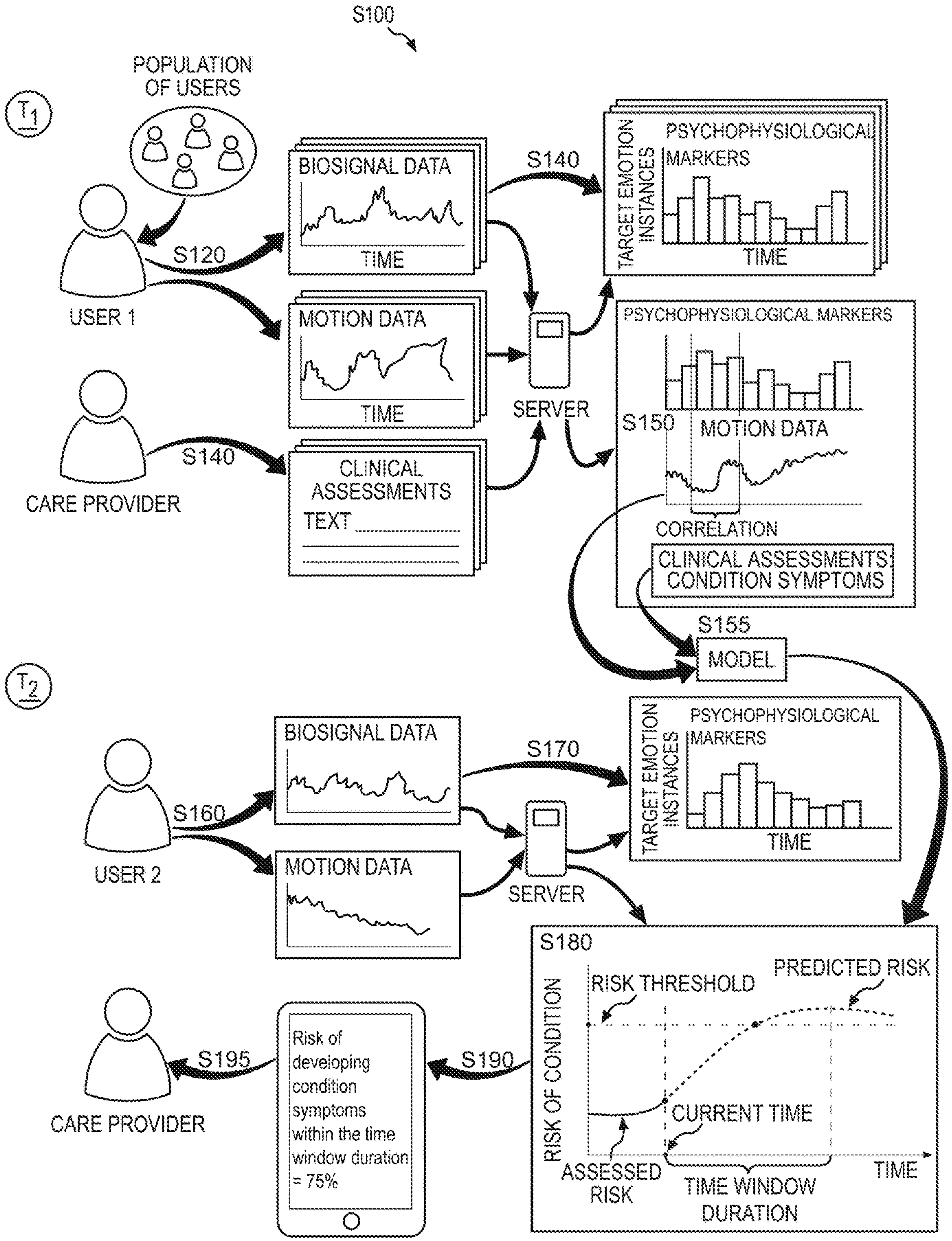
FIG. 2 is a flowchart representation of one variation of the method.
Figure 3:
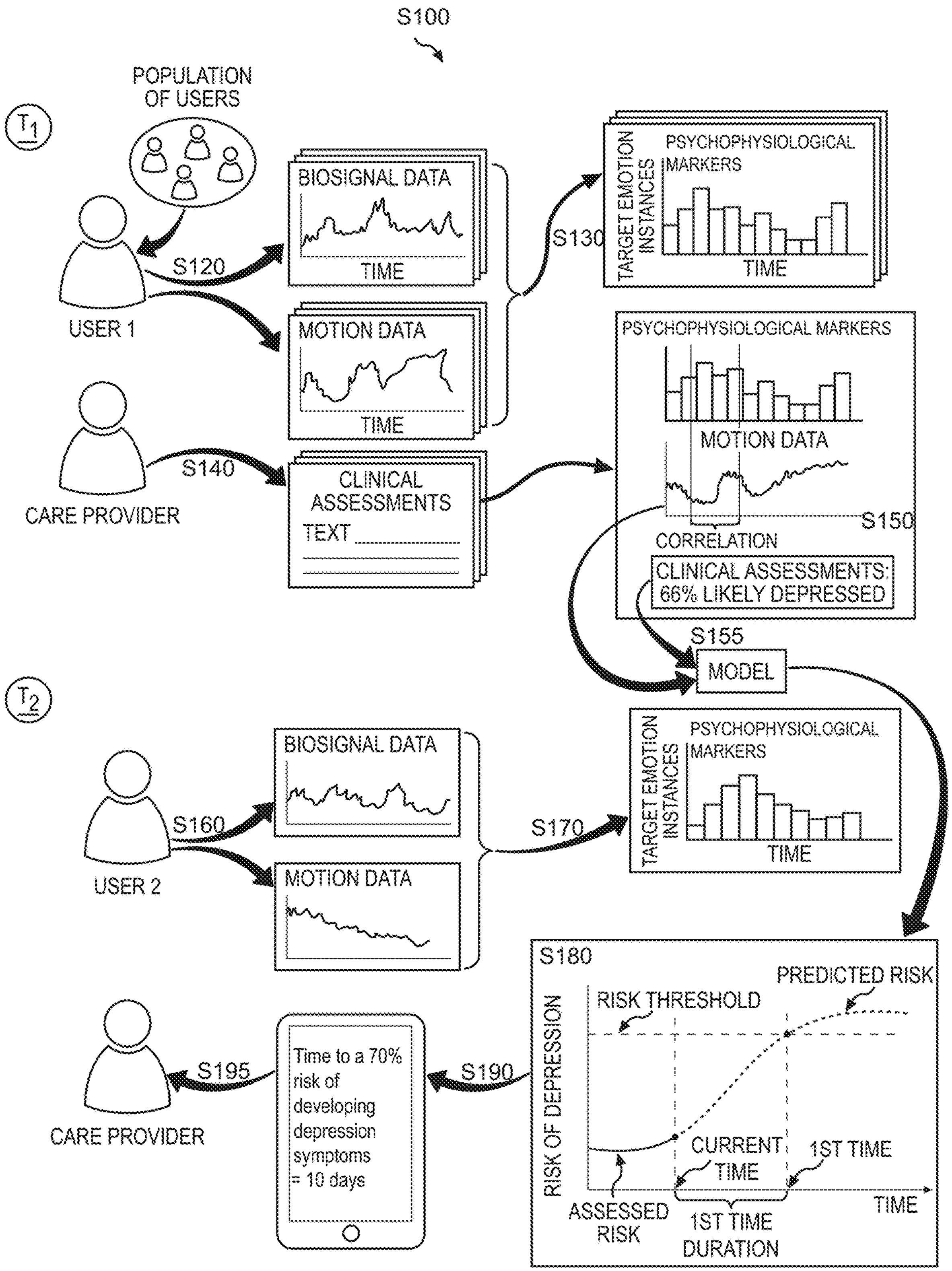
FIG. 3 is a schematic representation of one variation of the method.
Figure 4:
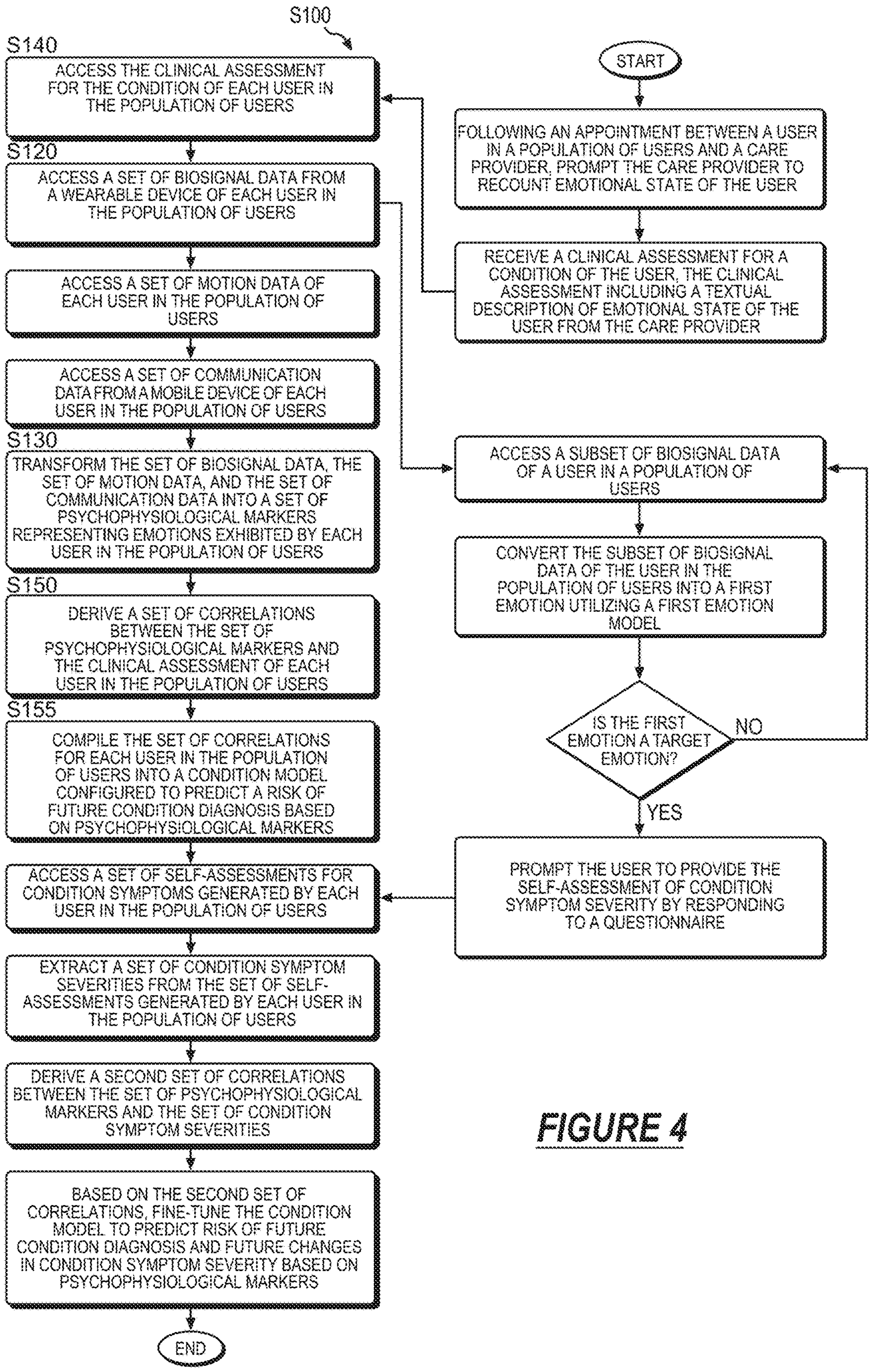
FIG. 4 is a flowchart representation of one variation of the method.
Figure 5:
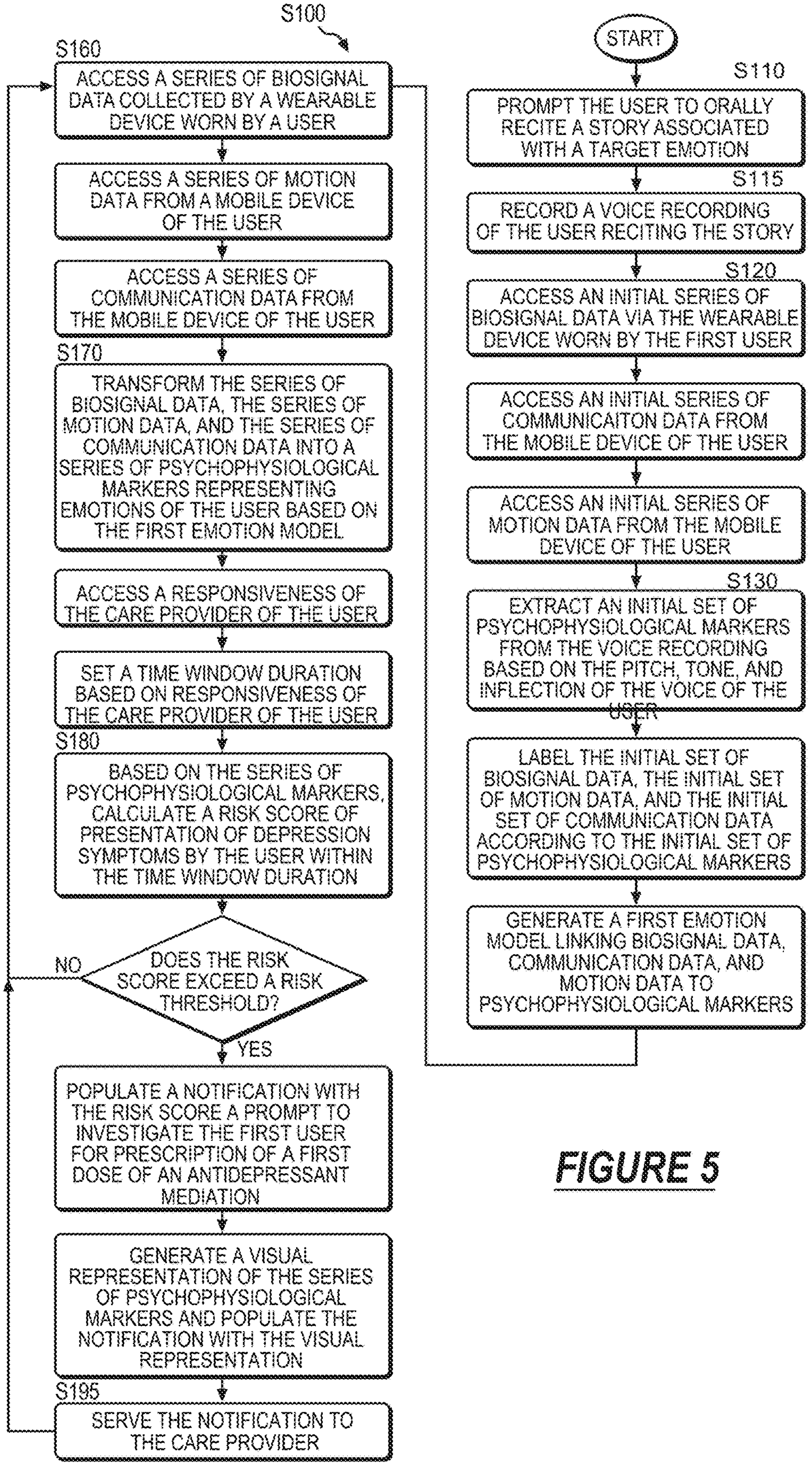
FIG. 5 is a flowchart representation of one variation of the method.
Figure 6:
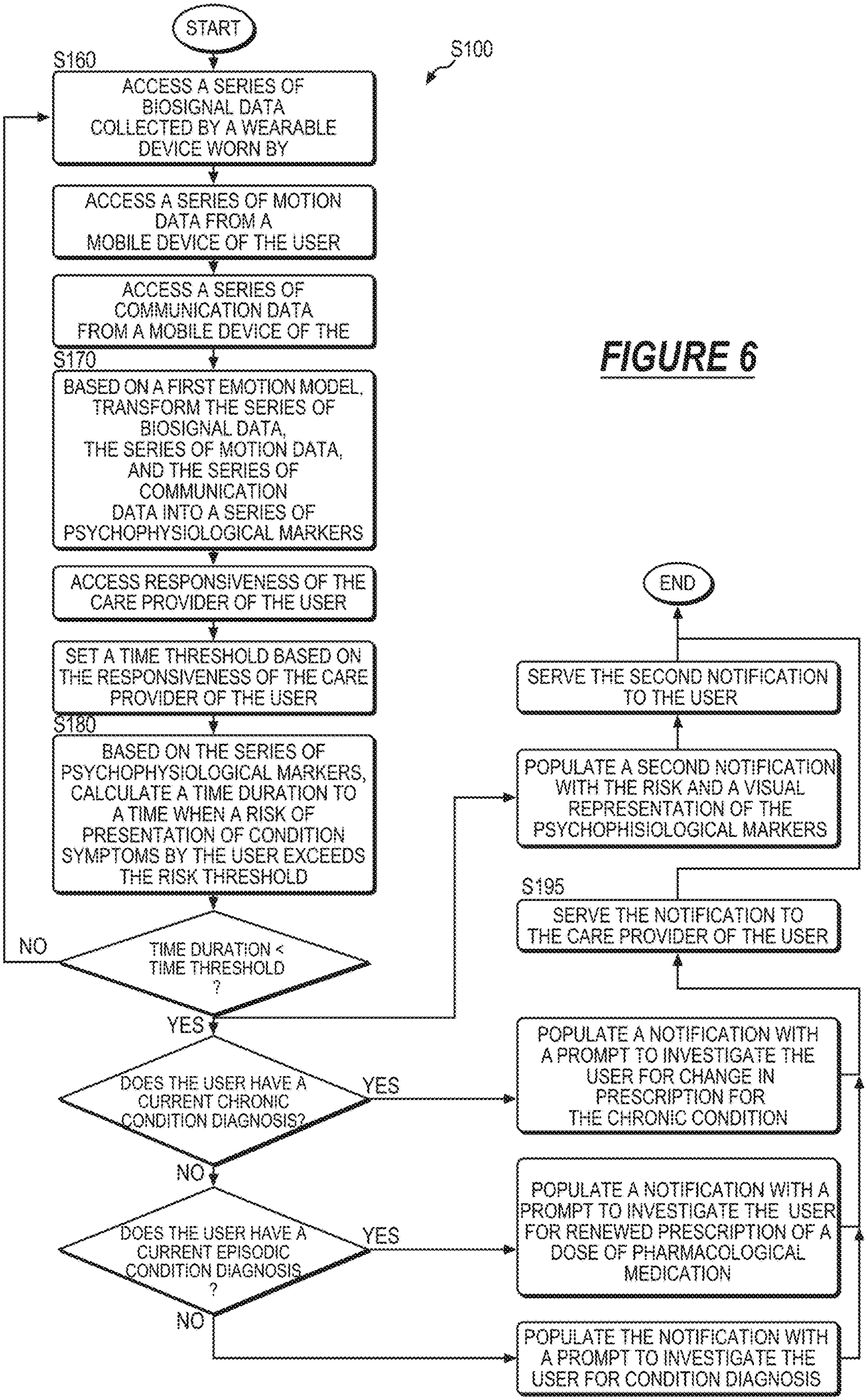
FIG. 6 is a flowchart representation of one variation of the method.
Figure 7:
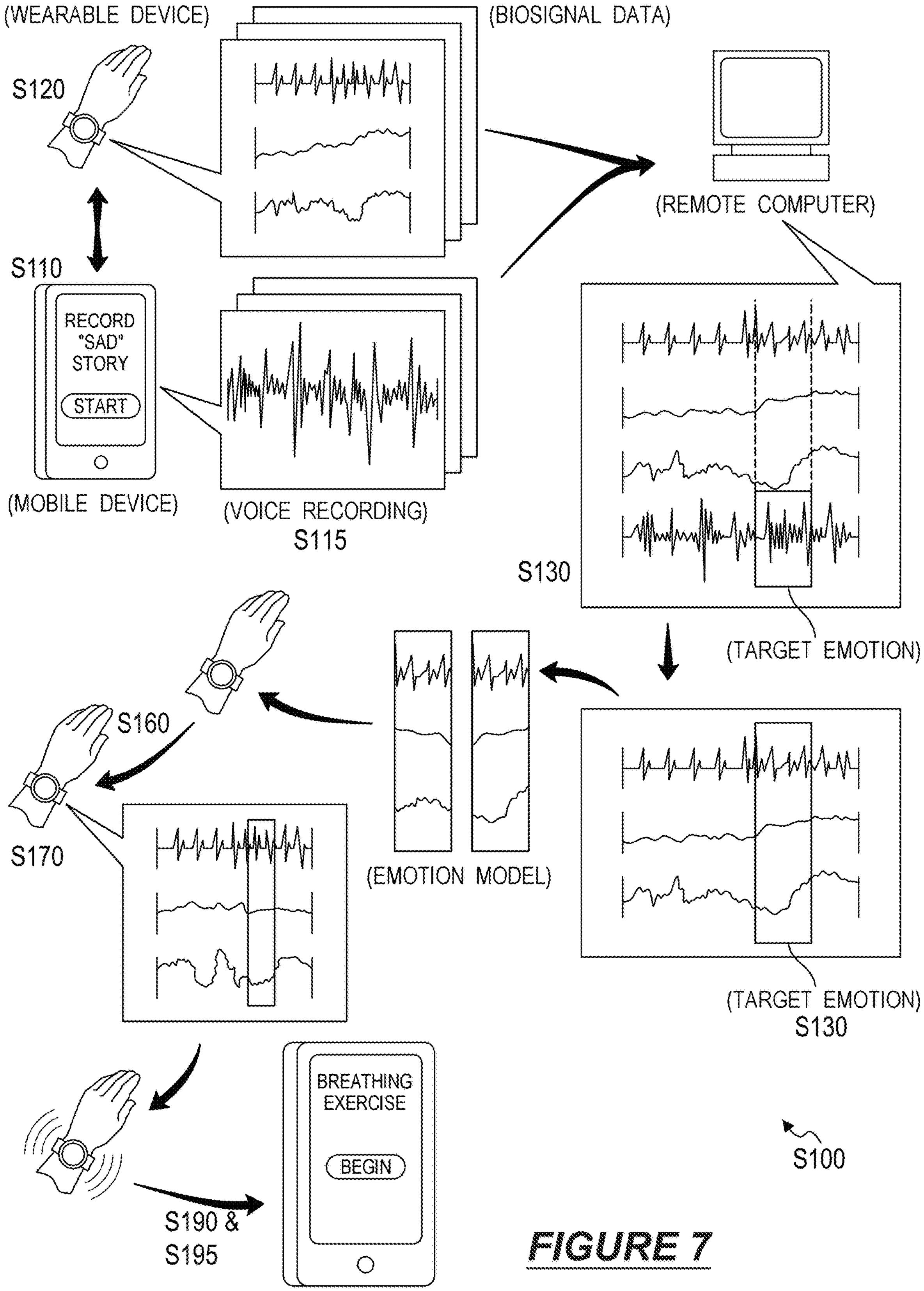
FIG. 7 is a flowchart representation of one variation of the method.
Figure 8:
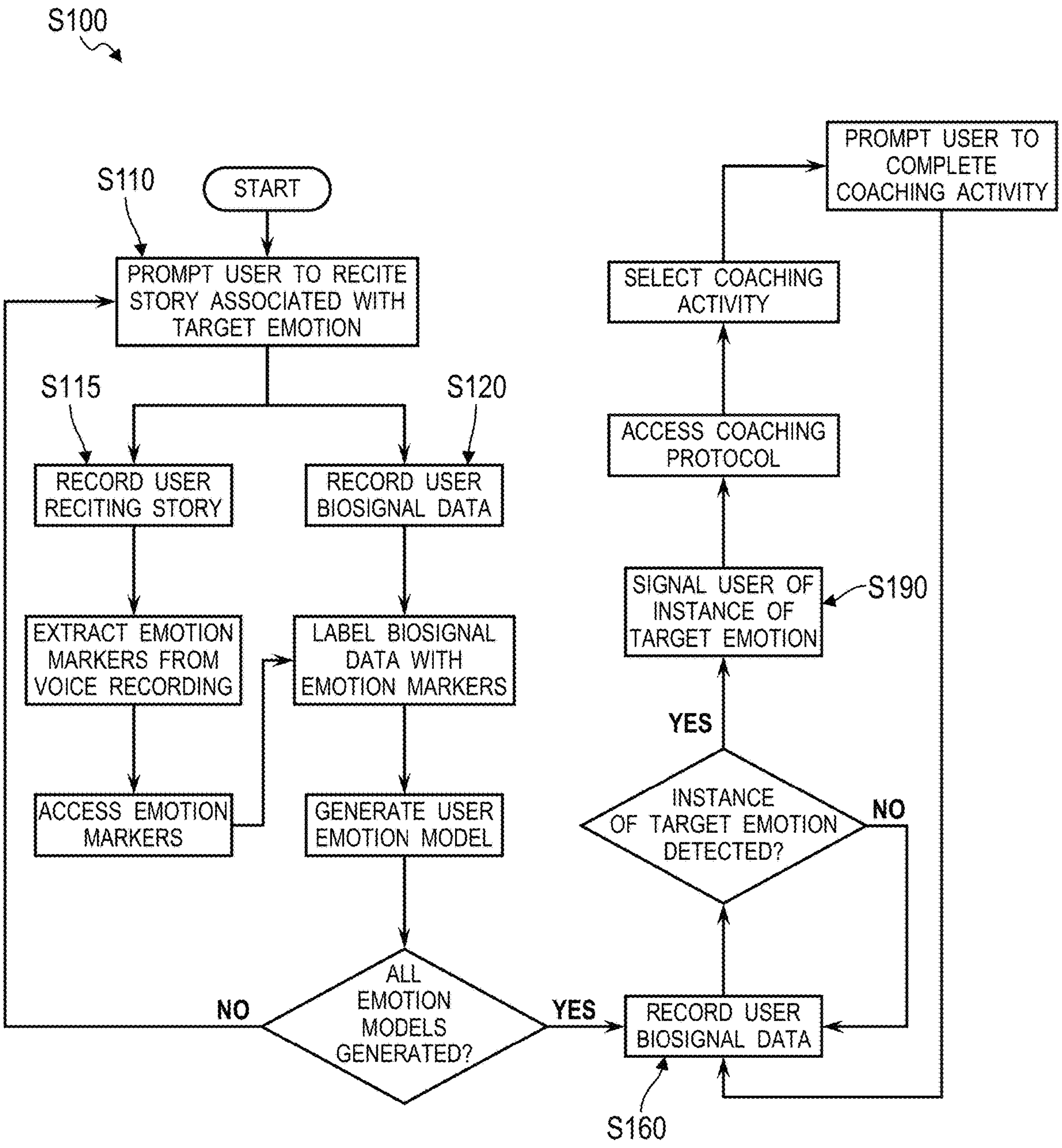
FIG. 8 is a flowchart representation of one variation of the method.
Figure 9:
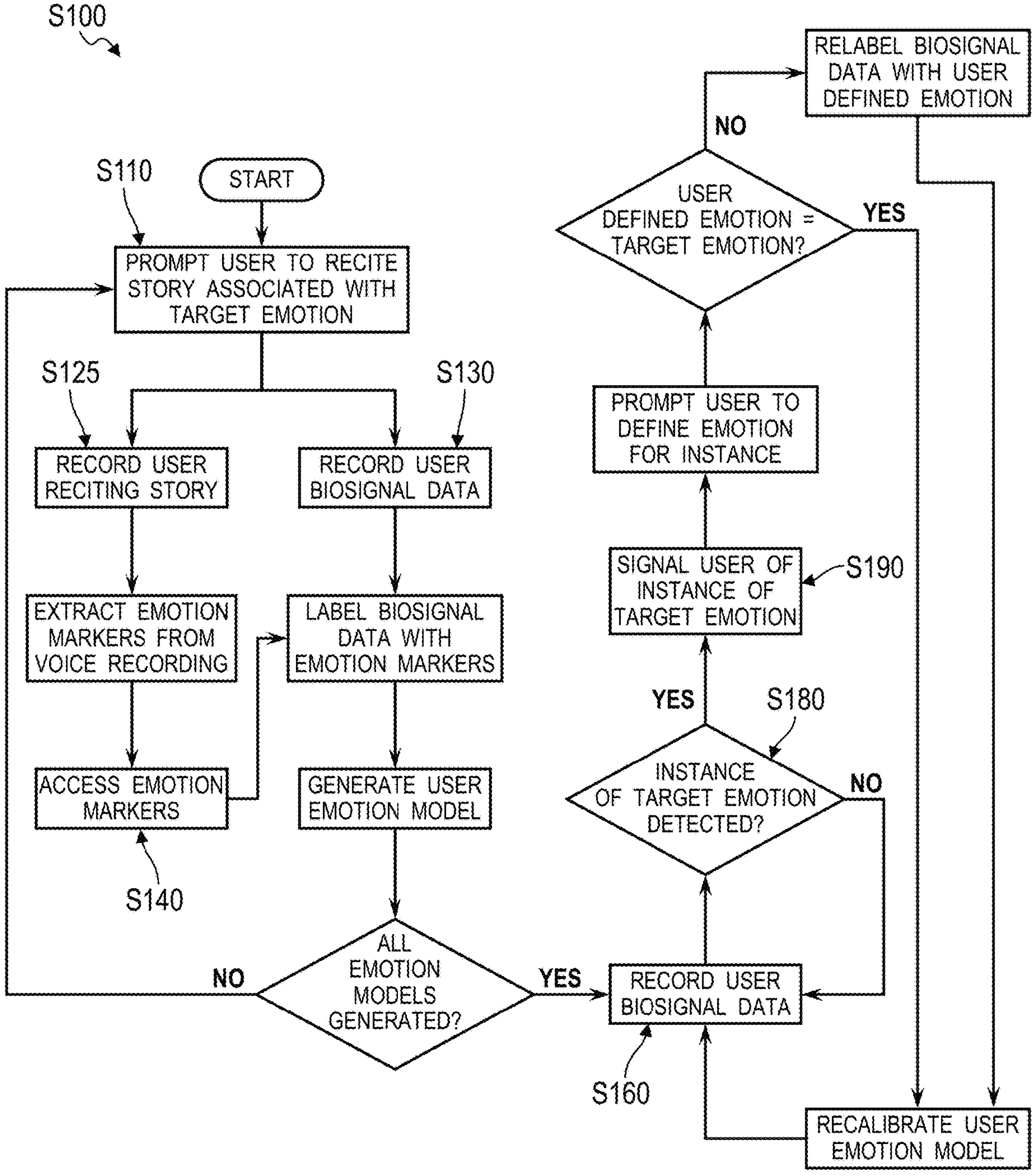
FIG. 9 is a flowchart representation of one variation of the method.

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

As shown in FIGS. 1-13, a method S100 includes, during a first time period, for each user in a user population: prompting the user to orally recite a story associated with a set of target emotions associated with a condition in Block S110; in response to detecting a voice of the user, recording a set of biosignals via a wearable device worn by the user in Block S120; generating a set of psychophysiological markers representing correlations between the set of biosignals and the set of target emotions in Block S130; accessing a clinical assessment for the condition in the user, the clinical assessment representing symptoms of the condition in the user in Block S140; and deriving a set of correlations between the set of psychophysiological markers and the clinical assessment for the condition in Block S150. The method S100 further includes compiling sets of correlations, derived for the user population, into a condition model configured to predict risk of the symptoms of the condition based on psychophysiological markers in Block S155.

The method S100 also includes, during a second time period: accessing a first series of biosignals collected by a wearable device worn by a first user in Block S160; identifying a first series of psychophysiological markers in the first series of biosignals, the first series of psychophysiological markers representing a first set of instances of the set of target emotions associated with the condition in Block S170; based on the first series of psychophysiological markers and the condition model, calculating a first risk score of presentation of the symptoms of the condition by the first user in Block S180; and, in response to the first risk score exceeding a threshold risk, generating a notification specifying an action protocol associated with the condition in Block S190 and serving the notification to the first user in Block S195.

1.1 One Variation: Notifying the Care Provider

In one variation, the method S100 includes, during a first time period, for each user in a user population: concurrently recording an audio recording of the user reciting a story associated with a target emotion associated with a condition in Block S115 and a set of biosignals via a wearable device worn by the user in Block S120; generating a set of psychophysiological markers representing correlations between the set of biosignals and the target emotion in Block S130; accessing a clinical assessment for the condition in the user, the clinical assessment representing symptoms of the condition in the user in Block S140; and deriving a set of correlations between the set of psychophysiological markers and the clinical assessment for the condition in Block S150. The method S100 further includes compiling sets of correlations, derived for the user population, into a condition model configured to predict risk of the symptoms of the condition based on psychophysiological markers in Block S155.

The method S100 also includes, during a second time period: accessing a first series of biosignals collected by a first wearable device worn by a first user in Block S160; identifying a first series of psychophysiological markers in the first series of biosignals, the first series of psychophysiological markers representing a first set of instances of the target emotion associated with the condition in Block S170; based on the first series of psychophysiological markers and the condition model, calculating a first risk score of presentation of symptoms of the condition by the first user in Block S180; in response to the first risk score exceeding a threshold risk, generating a notification specifying an action protocol associated with the condition in Block S190 and serving the notification to a care provider in Block S195.

1.2 One Variation: Generating Condition Model Based on Data of First User

In one variation, the method S100 includes, during a first time period: prompting a first user to orally recite a story associated with a target emotion associated with a condition in Block S110; in response to detecting a voice of the first user, recording a set of biosignals in Block S120 and recording a voice recording of the first user reciting the story in Block S115; based on the voice recording, identifying a set of psychophysiological markers representing correlations between subsets of biosignals, in the set of biosignals, and the target emotion in Block S130; accessing a clinical assessment for the condition in the first user, the clinical assessment representing symptoms of the condition in the first user in Block S140; deriving a set of correlations between the set of psychophysiological markers and the clinical assessment for the condition in Block S150; and, based on the set of correlations, generating a condition model configured to predict a risk of the symptoms of the condition based on psychophysiological markers of the first user in Block S155.

The method S100 also includes, during a second time period: accessing a second set of biosignals of the first user in Block S160; in the second set of biosignals, identifying a first psychophysiological marker, in the set of psychophysiological markers, representing a first instance of the target emotion in Block S170; based on the first psychophysiological marker and the condition model, calculating a first risk score of presentation of symptoms of the condition by the first user in Block S180; in response to the first risk score exceeding a threshold risk, generating a notification specifying an action protocol associated with the condition in Block S190 and serving the notification to the first user in Block S195.

2. Applications

Generally, Blocks of the method S100 can be executed by a companion application (herein referred to as the "computer system") executing on a mobile device in cooperation with a wearable device worn by a user to assess a risk of presentation of symptoms of a psychiatric condition (hereinafter, "condition") in a user (e.g., a patient)—based on physiological biosignal data (e.g., heart-rate, heart-rate variability, skin temperature, skin moisture, electrodermal activity, etc.), motion data (e.g., data collected by an internal measurement unit of the wearable device or the mobile device of the user such geolocation data or acceleration data), and/or communication data (e.g., voice, video, text, or user behavioral data collected from the mobile device) of the user—prior to the user exhibiting condition symptoms discernible to a medical care provider (e.g., medical doctor, nurse, psychiatrist, therapist, operator associated with the user) and to the user herself.

2.1 Story-Based Biosignal Calibration

In particular, the computer system can: prompt the user to recount a story about a target emotion (e.g., sad, stressed, distressed, etc.) associated with a psychiatric condition, such as clinical depression, generalized anxiety disorder, obsessive-compulsive disorder, or bipolar disorder; and capture a voice recording of the user orally reciting this story. During the user's recitation of this story, the wearable device can record a timeseries of physiological biosignal data (hereinafter, "biosignal data" or "biosignals") of the user via a suite of integrated sensors. The wearable device can offload the timeseries of the biosignal data to the mobile device. The computer system can then: access the voice recording; extract timeseries of pitch, voice speed, voice volume, pure tone, and/or other characteristics of the user's voice from the voice recording; and transform these timeseries of pitch, voice speed, voice volume, pure tone, and/or other characteristics of the user's voice into timestamped instances of the target emotion exhibited by the user while reciting the story. The computer system can then: synchronize these timeseries of biosignal data and instances of the target emotion; and implement regression, machine learning, deep learning, and/or other techniques to derive links or correlations between these physiological biosignals and the target emotion for the user. For example, the computer system can implement regression, machine learning, deep learning, and/or other techniques to derive patterns in the biosignal data that represent instances of the target emotion associated with the condition. The computer system can then: access clinical assessment for the condition in the user, the clinical assessment describing condition symptoms experienced by the user; and implement regression, machine learning, deep learning, and/or other techniques to derive correlations between the clinical assessment and the patterns of biosignal data associated with the target emotion. The computer system can: derive these correlations between the clinical assessment and the biosignal data patterns for a user population diagnosed with the condition; and compile these correlations into a condition model that predicts risk of a user developing symptoms of the condition within a certain time period based on biosignal data.

The computer system can then deploy the condition model to predict risk of a user developing symptoms of the condition by: recording timeseries biosignal data of the user via its integrated biosensors; interpreting the instances of the target emotion associated with the condition based on these timeseries biosignal data; deploying the condition model to assess a risk of the user developing symptoms of the condition based on the detected instances of the target emotion; and, in response to detecting an elevated risk of the user developing the condition symptoms, notifying the user or the care provider of the user of the increased risk. Additionally, in response to detecting the elevated risk of the user developing condition symptoms, the computer system can: select a user-specific and/or a condition-specific intervention for the condition, such as a pharmacological medication prescription for the condition, a coaching activity for the detected target emotion (e.g., a breathing exercise for a stressful emotion), or a therapy session (e.g., cognitive-behavioral therapy); and prompt the user to complete the intervention via the mobile device. For example, the computer system can prompt the user to complete the intervention each time it detects that the risk of developing condition symptoms within a certain amount of time exceeds the threshold risk. By prompting the user (or "intervening") in response to detecting excess risk, the system can enable the user to recognize an emotional event or physiological queues associated with the condition, take measures to prevent the onset of the condition, and thus reduce the risk of the user developing the condition symptoms.

In one variation, the computer system can: retrieve a timeseries of biosignal data and a timeseries of multimodal data (e.g., motion, location, sleep, communication, and/or social activity data accessed by the companion application from the mobile device) of the user population diagnosed with the condition; retrieve the clinical assessments (e.g., condition diagnoses) for the condition in these users; implement regression, machine learning, deep learning, and/or other techniques to derive correlations between the clinical assessments and the timeseries of biosignal data and the timeseries of multimodal data for each user in the user population; and compile these correlations into the condition model configured to predict a) a risk of condition relapse in a user within a target time window (e.g., controlled by a maximum time needed for a pharmacological medication prescription) and/or b) a time duration until risk of condition relapse in user will exceed a threshold risk (e.g., controlled by pharmacological medication administration procedures). The computer system can then interface with a companion application and a wearable device affiliated with a particular user to: collect biosignal data and multimodal data (e.g., motion, location, sleep, communication, and/or social activity data accessed by the companion application from the mobile device) of a particular user; inject these data into the condition model to predict risk of onset or relapse of the condition in the particular user within the target time window; and automatically prompt a care provider to investigate or consider the user for prescription or administration of a pharmacological medication if this predicted risk exceeds a threshold risk. Alternatively, the computer system can: inject these data into the condition model to predict the time duration until risk of condition relapse or onset by the particular user exceeds a threshold risk; and to automatically prompt the care provider to investigate or consider the user for prescription or administration of the pharmacological medication if this predicted time duration is less than a threshold duration.

2.2 Biosignal-Based Condition Tracking

Therefore, the computer system can: receive user data (e.g., biosignal, motion, location, and/or social interaction data) and corresponding condition evaluations for a large sample of users diagnosed with the condition; derive correlations between the user data and the corresponding condition diagnoses for each user in the sample of users; and compile these correlations into the condition model for predicting the risk of presentation of condition symptoms in users. The computer system can then apply the condition model to correlate new data (e.g., data collected during a subsequent time period) for a particular user with a) risk of condition occurrence (i.e., risk of condition relapse or onset by a user within a target time window) or b) time to condition occurrence (i.e., time duration until risk of condition relapse or onset of a user will exceed a threshold risk) prior to the particular user presenting with human-discernible condition symptoms (i.e., before even a professional or clinical care provider could discern relapse or onset with sufficient confidence to take action).

The computer system can then prompt the care provider to take action (e.g., arrange an appointment with the user, prescribe therapy, prescribe pharmacological medication to the user, administer pharmacological medication to the user) if the risk of condition occurrence exceeds a risk threshold or if time duration to condition occurrence or onset is falls below a time threshold to ensure that the user: receives medical care before experiencing discernible condition symptoms; and receives medical care before condition symptom severity reduces the user's willingness to seek medical attention. In addition, by prompting the care provider to take action (e.g., arrange an appointment with the user, prescribe therapy, prescribe pharmacological medication to the user, administer pharmacological medication to the user), the computer system can enable the care provider to: avoid guessing when the user may need an intervention (e.g., therapy, pharmacological medication, etc.) administered; avoid prematurely administering intervention to the user; avoid erroneously administering additional pharmacological medication (e.g., antidepressant medication) to the user when the additional pharmacological medication does not benefit the user and/or may harm the user (e.g., due to toxicity, side effects, and/or allergies); avoid failing to act when a timely intervention would have positive effect on the user in long term; avoid failing to act when a timely intervention would enable the user to avoid developing condition symptoms.

Therefore, by predicting risk of presentation of condition symptoms within the target time window, the computer system can enable the care provider to foresee condition occurrence in the user significantly in advance of the condition symptom onset. For example, the computer system can predict the risk of condition occurrence (e.g., relapse or onset) weeks or months in advance of the appearance of the condition symptoms. Accordingly, the computer system can enable the care provider to respond to the prediction by administering the intervention (e.g., pharmacological medication, therapy) to the user before the user experiences the condition symptoms. For example, by predicting the risk of condition occurrence in advance (e.g., weeks or months before the condition occurrence may occur), the computer system can enable a user having poor access to medical care (e.g., long wait times for medical appointments, poor access to pharmacy/medications) to receive the pharmacological medication or a medical appointment with the care provider before the condition relapse or onset occurs. In another example, by predicting the risk of condition occurrence in advance, the computer system can enable a care provider to administer the pharmacological medication to the user such that the pharmacological medication takes effect prior to the condition occurrence in the user and peak effectiveness of the pharmacological medication corresponds to the predicted condition occurrence event.

2.3 Generating the Condition Model

In one implementation, during a first time period, the computer system can prompt a care provider (e.g., coach, psychologist, psychiatrist) of a user in a user population to complete a clinical assessment configured to evaluate the state (e.g., mental, emotional, cognitive state, emotional awareness, appearance) of the user, which may include indicators of the condition relapse or onset. For example, the set of clinical assessments can include descriptions of the conditions symptoms experienced by the user, the appearance of the user, and the emotional state of the user. In addition, during the first time period, the computer system can prompt the user to complete a self-assessment configured to evaluate symptom severity of the condition symptoms experienced the user. In addition, during the first time period, the computer system can access a set of motion data and a set of communication data stored on the mobile device of the user and upload these data to the computer system. Simultaneously, the wearable device worn by the user in the user population can upload a set of biosignal data to the computer system. Therefore, the computer system can access the clinical assessment, the self-assessment, the set of motion data, the set of communication data, and the set of biosignal data of each user in the user population.

Then, the computer system can train the condition model (e.g., transformer deep neural network) to identify correlations between the user data—including the set of biosignal data, the set of motion data, and the set of communication data—and the set of clinical assessments. Therefore, the computer system can train the condition model to identify patterns in the user data that are correlated with clinical assessments, which are indicative of the severity and quantity of condition symptoms exhibited by the user and observed by the care provider.

In one implementation, the computer system can tune the condition model (e.g., by adjusting parameters of the model) to predict the self-assessments (e.g., responses to Patient Health Questionnaire-9, generalized Anxiety Disorder-7, Hamilton Rating Scale for Depression, etc.) of a user, which reflect severity of the condition symptoms of the user. For example, the computer system can fine-tune the condition model by executing the condition model to predict a set of masked (but known) self-assessments based on the set of biosignal data, the set of motion data, and the set of communication data of the user. Then, if the predicted self-assessments in the set of self-assessments do not match the known self-assessments, the computer system can adjust the parameters of the condition model to yield a match between the predicted self-assessments and the known self-assessments. Accordingly, the computer system can tune the condition model to accurately predict changes in severity of the condition symptoms of the user.

Therefore, the computer system can train the model to: predict a clinical assessment for a user, the clinical assessment indicative of the severity and quantity of condition symptoms exhibited by the user and observed by the care provider; predict anticipated changes in severity of the set of condition symptoms of the user; and calculate a risk of condition relapse or onset in the user within the target time window based on the severity, quantity, and the anticipated changes in severity of the set of condition symptoms of the user.

2.4 User Onboarding and Risk Prediction

In one implementation, the computer system can onboard the user diagnosed with the condition by the medical care provider and receiving medical care from the care provider to manage her condition. For example, the user may be currently (or previously) prescribed a pharmacological medication (e.g., antidepressant medication) by the care provider. Additionally, or alternatively, the computer system can onboard a user exhibiting non-clinically-significant condition symptoms but for whom potential symptom worsening may require a diagnosis by the care provider.

In this implementation, the wearable device can offload a series of biosignal data to the computer system, such as via the mobile device in real-time. In addition, the companion application can access a series of motion data and a series of communication data from the mobile device and upload these data to the computer system. The computer system can then access the condition model (e.g., transformer deep neural network) trained to predict the risk of condition occurrence (i.e., relapse or onset) based on the series of biosignal data, the series of motion data, and the series of communication data. The remote computer system can therefore leverage the concurrent series of biosignal data, motion data, and communication data, and the condition model to interpret a trajectory of a mental state of the user, and therefore, interpret the risk of the user exhibiting the set of condition symptoms within the target time window.

Furthermore, in response to the risk of the user exhibiting a set of condition symptoms within the target time window exceeding a threshold risk (or falling within a target range of risk levels), the computer system can: generate a notification for the care provider, the notification indicating the risk and prompting the care provider to investigate (e.g., set a medical appointment with, review biosignal data of) the user for prescription of a first dose of an pharmacological medication; and serve the notification to a care provider.

In one example, in response to receiving the notification, the care provider may: view the series of biosignal data, the series of motion data, and a series of communication data of the user; based on these data, confirm the risk of condition occurrence in the user within the target time window; review prescription history and/or medical record of the user; and re-prescribe a course of condition mediation (e.g., previously-prescribed medication) to the user to prevent the user from developing symptoms of condition within the target time window.

Therefore, the computer system can enable the care provider to: remotely monitor the mental health of the user while avoiding frequent medical appointments between the user and the care provider; assess the risk of the user developing the condition symptoms within a given time period; review the data supporting the risk of the condition occurrence in the user occurring within the given time period; and, based on these data, prescribe treatment to the user before the user experiences the set of symptoms associated with condition occurrence. Accordingly, the computer system can enable the user to avoid experiencing a sudden onset of the condition symptoms and thereby prevent the user from seeking emergency medical treatment for these symptoms.

In another example, in response to receiving the notification indicating the risk of condition relapse or onset in the user within the target time window exceeds the threshold risk, the care provider may: arrange a medical appointment (e.g., phone call, check-in) with the user to observe the mental state of the user; and confirm the risk of condition relapse or onset in the user within the target time window. The care provider may further: review prescription history and medical records of the user; and, in response to identifying that the user is currently prescribed a first dose of the pharmacological medication, adjust the treatment plan of the user (e.g., by increasing/decreasing the dose of pharmacological medication currently prescribed to the user or prescribing a dose of a second pharmacological medication to the user) to prevent the user from developing the symptoms of condition within the target time window.

Therefore, the computer system enables the user—who may be experiencing the condition symptoms including fatigue, lack of concentration, and therefore, may find it difficult to initiate contact with the care provider—to report to the care provider an account of the current mental state to the user. Additionally, the computer system enables the care provider to: monitor response of the user to the currently prescribed pharmacological medication; adjust the dose of the currently prescribed pharmacological medication in response to the user not responding to the dose; and prioritize arranging an appointment with a first user who is at a greater risk of condition relapse (or onset) than with a second user who is at a lesser risk of condition relapse (or onset) within the target time window. Accordingly, the computer system can enable the care provider to direct medical resources to patients who are at greatest risk of condition relapse (or onset).

2.5 Conditions

Generally, the method S100 is described as a method for assessing a risk of presentation of symptoms of a psychiatric condition, such as clinical depression, in a user. However, the method S100 is also applicable assessing risks of presentation of condition symptoms of other psychiatric conditions, associated with characteristic emotional responses, such as generalized anxiety disorder, bipolar disorder, obsessive-compulsive disorder, post-traumatic stress disorder, and various phobias. In addition, the method S100 is applicable to assessing risks for complications, poor outcomes, or delayed recovery from various physiological conditions, such as injuries, cancer, and digestive disorders, in the user. For example, Blocks of the method S100 can be executed to assess risk of delayed wound healing in a user, which can be correlated with negative emotions experienced by the user. Furthermore, the method S100 is applicable to assessing risks of onset of the various physiological conditions, which may be linked to the emotional states experienced by the user. For example, Blocks of the method S100 can be executed to assess risk of a user developing hypertension or obesity, which is correlated with high stress level experienced by the user.

3. Condition Model Generation

Generally, for each user in a user population diagnosed with a condition, such as clinical depression, the computer system can: prompt the user to orally recite a story associated with a set of target emotions, which are linked to the condition; record an audio recording of the user reciting the story, the audio recording representing a set of instances of the set of target emotions of the user; while the user is reciting the story, record a set of biosignals via the wearable device; generate a set of psychophysiological markers representing biosignal patterns indicating individual target emotions in the set of target emotions; access a clinical assessment for the condition in the user, the clinical assessment representing condition symptoms in the user; and derive correlations between the set of psychophysiological markers and the clinical assessment for the condition in the user. Then, the computer system can compile sets of correlations, derived for each user in the user population, into a condition model configured to predict, based on psychophysiological markers, risk of presentation of the condition symptoms in a user. Therefore, the computer system can: identify psychophysiological markers of the set of emotions, such as sadness, associated with the condition, such as clinical depression, in a set of biosignal data; and, based on the psychophysiological markers and the condition model, trained on biosignal data of the user population and corresponding clinical assessments for the condition, predict a risk of presentation of the condition symptoms in the user.

3.1 Population Story Recording

Blocks S110 and S115 of the method S100 recite, during a first time period and for each user in a user population: prompting the user to orally recite a story associated with a set of target emotions associated with a condition; and, in response to detecting a voice of the user, recording a voice recording of the user. Generally, in Blocks S110 and S115, the computer system can: prompt the user to tell a story regarding one or more target emotions associated with the condition (e.g., a story involving the user experiencing sadness, hopelessness, anger, guilt); and record the story via an integrated microphone of a mobile device of the user. Therefore, based on the audio recording, the computer system can generate a sequence of instances of the set of target emotions that the user experienced during recitation of the story.

In one implementation, the computer system can prompt the user to orally recite the story associated with the set of target emotions associated with the condition including a generalized anxiety disorder, the set of target emotions including restlessness and fear. In another example, the computer system can prompt the user to recite the story associated with a second set of emotions, including restlessness and disgust, associated with a second condition, including obsessive-compulsive disorder.

In another implementation, the computer system can prompt the user to orally recite a personal story associated with a user experience that elicits the set of target emotions. Therefore, by prompting the user to orally recite a personal emotional story, the computer system can elicit (or draw out) the target emotions in the user by requiring the user to recall and recite the story, thus provoking the associated emotions that the user experienced during the events of the surrounding story.

In another implementation, the computer system can: display a written story to the user via a mobile device, the written story configured to elicit the set of target emotions; and prompt the user to orally recite the written story. For example, the computer system can: based on the set of target emotions associated with the condition, select a story configured to elicit the set of target emotions, from a library of stories associated with various emotions; display the story on the screen of the mobile device of the user; and direct the user to read the story. In another example, the computer system can: prompt the user to select a story associated with the set of target emotions from a library of stories associated with various emotions, display the story on the screen of the mobile device of the user; and direct the user to read the story. Therefore, by prompting the user to orally read an emotional story, the computer system can elicit (or draw out) the target emotions in the user.

In one example, the computer system can prompt the user to recite a story regarding particular life events (e.g., the birth of a child, graduating high school, etc.) commonly associated with particular target emotions. In this implementation, the computer system can prompt the user to confirm the type of emotion(s) the user experienced during recitation of the story. For example, the computer system can: prompt the user to recite a story about the birth of a child; record the user reciting the story; display a list of possible target emotions associated with the birth of the child (e.g., joy, distress, etc.); and prompt the user to select one or more emotions that the user associated with the event. Additionally, the computer system can flag sound clips of segments of the story; play back the sound clips for the user; and prompt the user to label the sound clips with one or more target emotions that the user experienced during recitation of the particular sound clip.

In another implementation, the computer system can prompt the user to recite a story of a minimum length in order to acquire a minimum number of data points for instances of the target emotion in the set of target emotions. For example, the computer system can prompt the user to recite a story at least two minutes in length and display a timer counting down two minutes on the user's mobile device. The system can also—upon detection of a long period of silence and prior to completion of a minimum story length—prompt the user to continue the story or display guiding questions to extend the story (e.g., "describe how that made you feel," "please elaborate," "what happened next?" etc.)

In another implementation, the computer system can: prompt the user to recite a story; in response to the user selecting a record button displayed on the user's mobile device, record the user reciting the story; and trigger the wearable device to initiate recording the set of biosignals until the user selects the record button a second time in order to cease recording. For example, the computer system can—in response to the user selecting the record button—send the trigger to the wearable device to begin recording a timeseries of biosignal data and timestamp the beginning of the biosignal data and the beginning of the voice recording to synchronize the two data streams and to enable later applying of the data from the voice recording onto the biosignal data.

In one implementation, the companion application can: initiate a timer in response to receiving an indication from the user that the user has started reciting the emotional story (e.g., the user pressing a start-recording button); record the user reciting the emotional story; stop the recording in response to expiration of a timer (e.g., after two minutes); store the voice recording locally on the mobile device; encrypt the voice recording; and transmit the encrypted voice recording to a remote computer system to extract emotion markers. In this implementation, the companion application can display a timer counting down on the screen of the user's device to continuously notify the user of the time constraint. In another implementation, the companion application can track the timer internally (i.e., without displaying the timer on screen) to reduce distraction to the user to avoid potentially generating discomfort in the user and distorting the biosignal data for the target emotion.

In one implementation, the companion application can automatically detect a period of silence during the recitation of the story and terminate the recording in response to detecting the period of silence. Generally, the companion application can: access the integrated microphone on the mobile device while prompting the user to recite an emotional story; detect an audio signal indicating that the user has begun speaking; in response to detecting the user speaking, begin recording the voice recording; detect a period of silence (e.g., a ten second pause); in response to detecting the period of silence, stop recording; store the voice recording locally on the mobile device; encrypt the voice recording; and transmit the encrypted voice recording to a remote computer system to extract emotion markers. By not requiring the user to start and stop the voice recording, the system can reduce distraction to the user in order to acquire more accurate biosignal data from the user during recitation of the emotional story.

3.2 Population Biosignal Data Collection

Generally, Block S120 of the method S100 recites, for each user in the user population, recording a set of biosignals (e.g., heart-rate, heart-rate variability, skin temperature, skin moisture, electrodermal activity, etc.) via a wearable device worn by the user in response to detecting a voice of the user. Generally, in Block S120, the computer system can record the set of biosignals via the wearable device during the user's recitation of the story. Therefore, the computer system can record a set of biosignals correlated with the sequence of instances of the set of target emotions experienced by the user during recitation of the story. Thus, the computer system can link particular instances of the target emotions to biosignal patterns present in the set of biosignals.

In one implementation, the computer system can record the set of biosignals via a set of sensors integrated into the wearable device, the set of biosignals including a skin moisture level, a heart rate variability, a body temperature, and an electrodermal activity level of the user. More specifically, the computer system can: trigger the wearable device to access the set of sensors (e.g., a electrodermal activity sensor (or "EDA" sensor), a heart rate or photoplethysmogram sensor (or "PPG" sensor), a skin temperature sensor, an inertial measurement unit (hereinafter "IMU"), an ambient humidity sensor, and an ambient temperature sensor) and record biosignal data (e.g., the set of biosignals) at each sensor at a series of time increments; and, concurrently, trigger an integrated microphone of the mobile device to record the voice recording of the user story.

Figure 11:
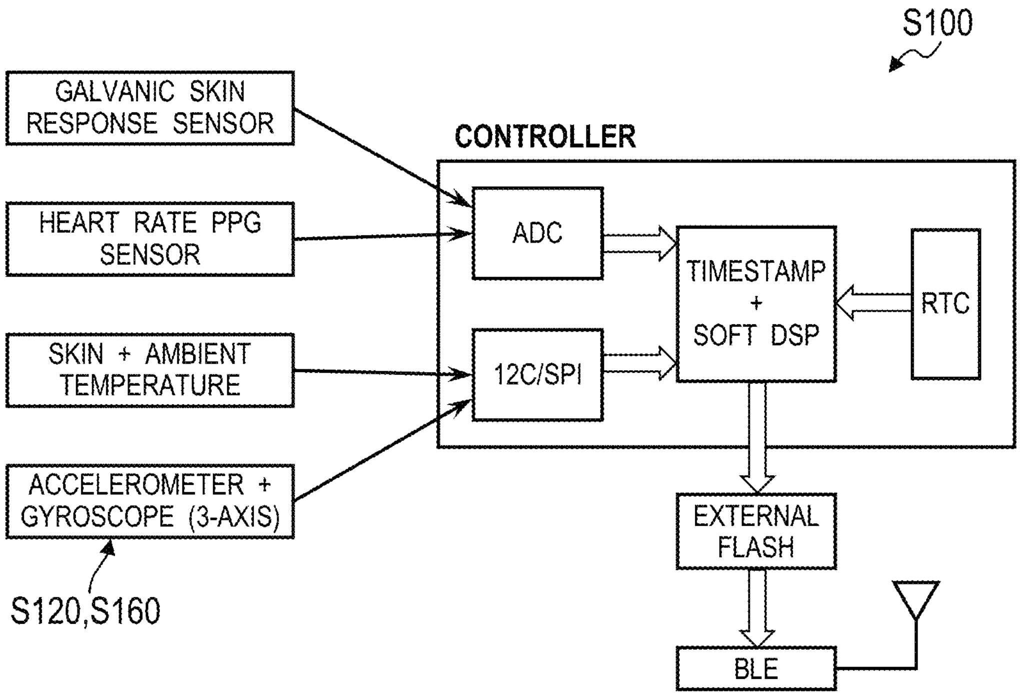
FIG. 11 is a flow chart representation of one variation of the method.
Figure 12A:
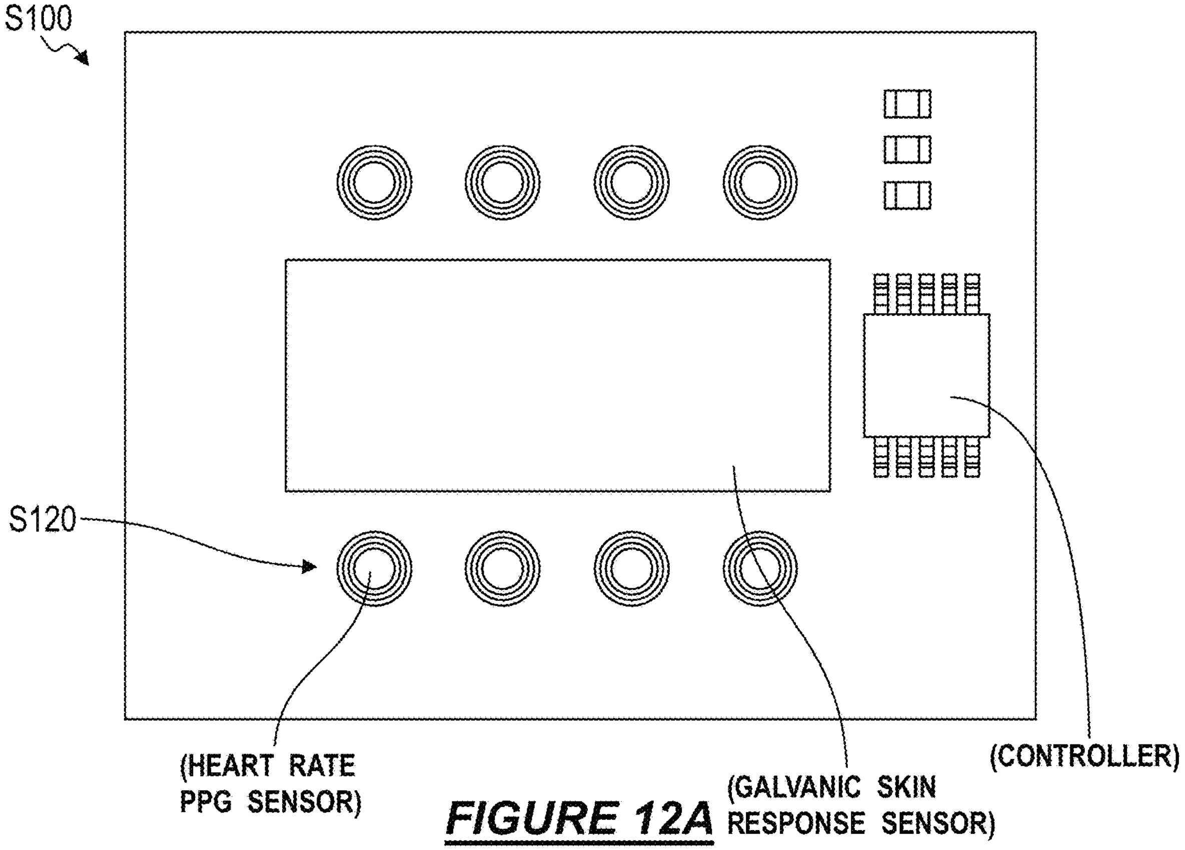
FIG. 12A is a schematic representation of one variation of the method.
Figure 12B:
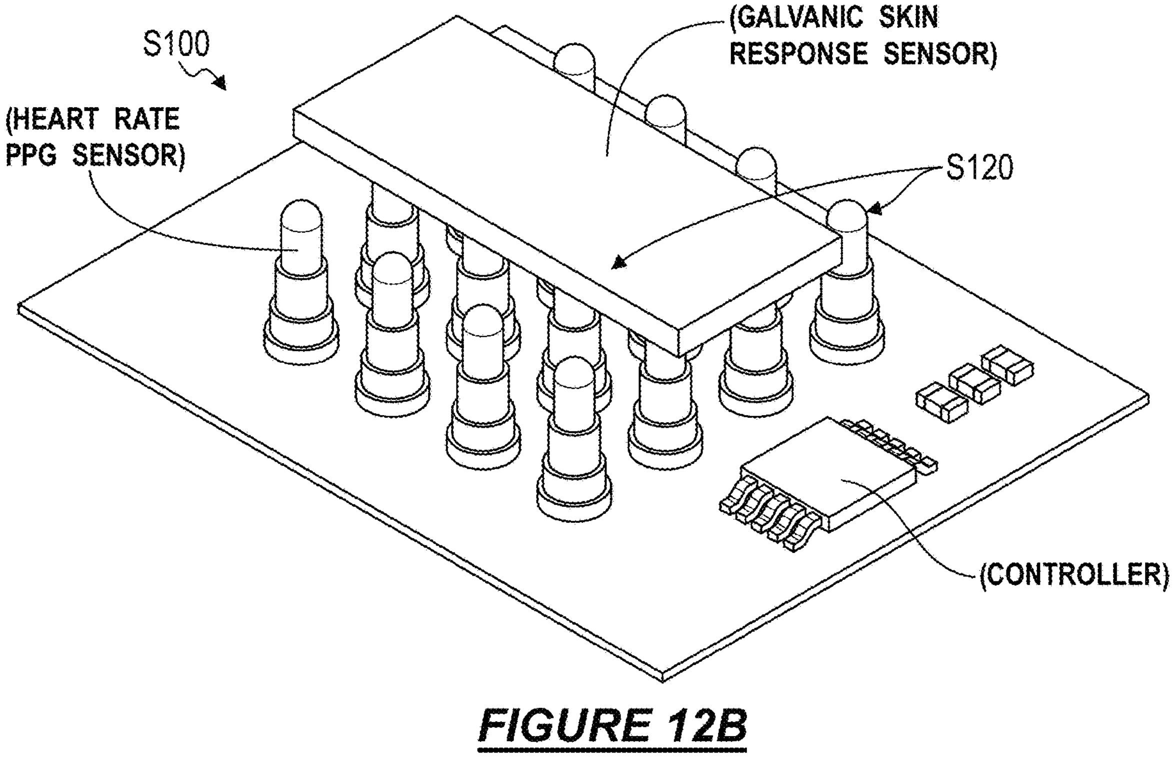
FIG. 12B is a schematic representation of one variation of the method.
Figure 13:
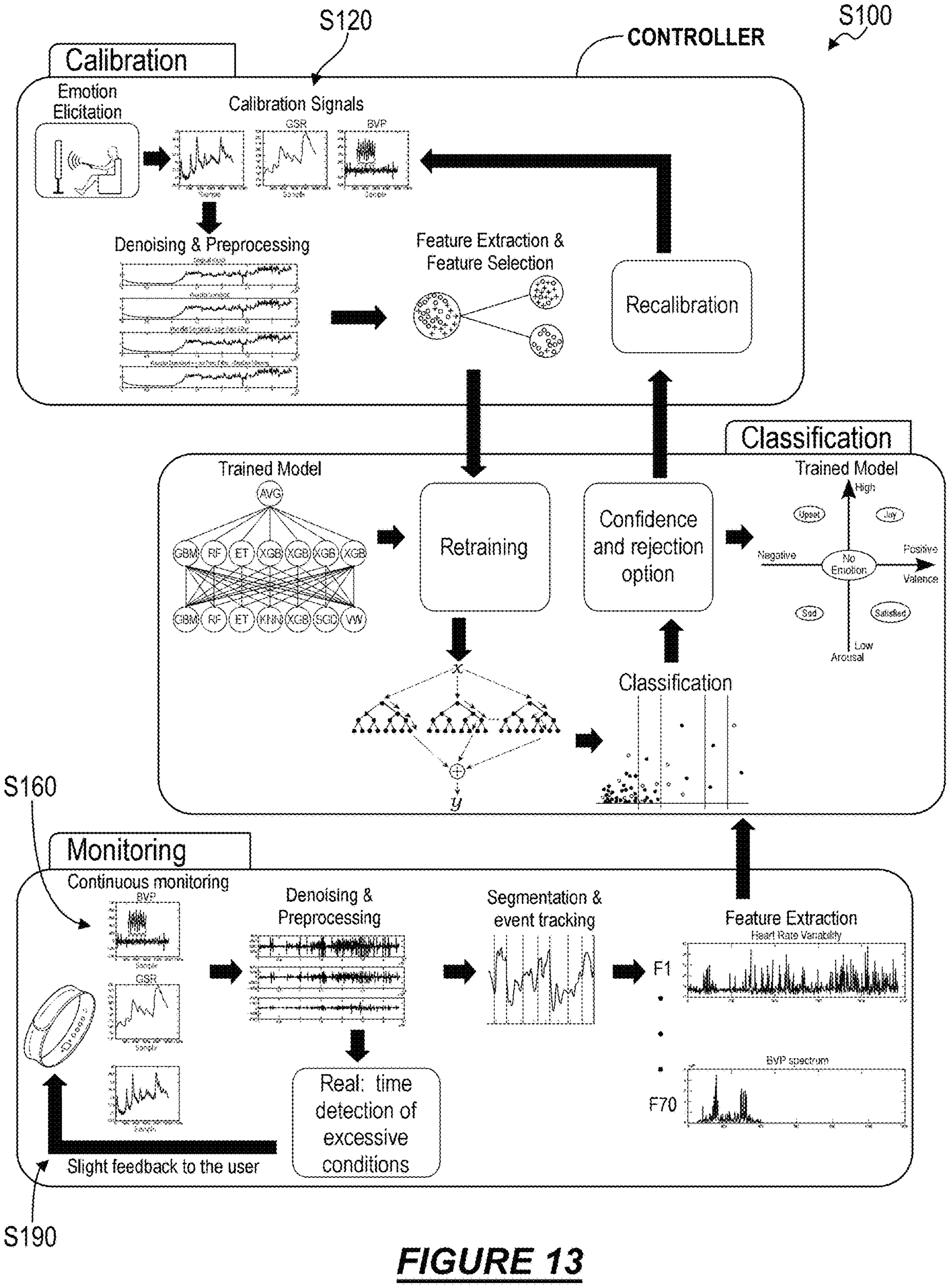
FIG. 13 is a schematic representation of one variation of the method.

In one implementation, while recording the user reciting the story, the computer system can access: the electrodermal activity sensor to record the skin conductance of the user; the heart rate sensor to record the pulse of the user; the IMU to record the motion of the user; the skin temperature sensor to record the user's skin temperature; the ambient humidity sensor to record the relative humidity of the air around the user; and the ambient temperature sensor to record the relative heat of the air around the user, as shown in FIGS. 11, 12A, and 12B. For example, the system can: initiate a voice recording of the user; record a current skin temperature of 100 degrees via the skin temperature sensor; record an ambient temperature of 101 degrees via the ambient temperature sensor; calculate the user's real skin temperature as 98 degrees based on the user's recorded skin temperature and the recorded ambient temperature; and write a baseline skin temperature of 98 degrees to the user's general user profile. The system can then store the user's baseline skin temperature locally on the wearable device and reference the user's baseline skin temperature while recording the user's biosignal data at a later time.

Similarly, the wearable device can record a baseline resting heart rate, a baseline skin conductance, and a baseline level of activity for the user and store all the baseline data locally on the wearable device or on the remote computer system as part of the user profile.

In one implementation, the wearable device can sample biosignal data intermittently (e.g., one a five-second interval) to reduce power consumption and minimize data files. In another implementation, the wearable device can selectively choose times to record biosignal data continuously instead of intermittently (e.g., if the system detects the user is trending toward an instance of a target emotion). After recording the biosignal data at the wearable device, the wearable device can transmit the biosignal data to the mobile device for storage in the user's profile, such as locally on the mobile device and/or remotely in a remote database.

In one implementation, shown in FIGS. 11, 12A, and 12B, the wearable device records biosignal data of the user (e.g., skin moisture, skin temperature, and heart rate variability) concurrently with recording ambient environmental data (e.g., humidity, ambient temperature) and other related data (e.g., the motion of the user or motion of the user's mode of transportation). For example, the wearable device can: access the electrodermal activity sensor to detect the user's current skin moisture data; identify that the user's current skin moisture data is above a normal threshold; access the ambient humidity sensor to detect an ambient humidity level; identify the ambient humidity sensor is above the normal threshold; identify that the ambient humidity level is affecting the skin moisture data; and calculate a real skin moisture level based on the ambient humidity level. Therefore, the system can identify environmental situations that can affect the biosignal data of the user (e.g., washing her hands, running, etc.).

Furthermore, the wearable device can: access the set of sensors integrated into the wearable device worn by the user to acquire a set of biosignal data; and transmit the set of biosignal data to the mobile device. The companion application—executing on the user's mobile device—can then validate the set of biosignal data with generic baseline biosignal data from a generic user profile (e.g., a profile defining a range of standard resting heart rates for a generic user, a range of normal skin temperatures, etc.), or from additional sources (e.g. confirming the ambient humidity recorded by the wearable device with the ambient humidity recorded by a third-party weather service, the time of day with the internal clock on the mobile device, etc.). For example, the wearable device can: record a particular physiological biosignal for the user (e.g., a resting heart rate); access a generic user profile including an acceptable (or expected) range for the particular biosignal (e.g., a resting heart rate between 60-100 beats per minute or "bpm"); and—if the biosignal data is in acceptable range (e.g., 65 bpm)—store user biosignal data as a normal baseline for the user. Conversely, if the biosignal data is not in the acceptable range (e.g., a resting heart rate of 40 bpm), the system can run diagnostics on the sensor or prompt the user to confirm the wearable device is on (or properly installed). The system can also prompt the user to override out of range data (e.g., a marathon runner with a resting heart rate of 40 bpm can manually validate her resting heart rate.)

In another implementation, the companion application can: prompt the user to engage in a series of activities (e.g., sitting, walking, holding her breath, etc.); record a series of biosignal data via the set of sensors integrated into the wearable device; label the biosignal data with the associated activity; and store the labeled biosignal data in a user profile to enable the system to eliminate false positives triggered by normal activities.

3.3 Population Marker Generation

Block S130 of the method S100 recites: generating a set of psychophysiological markers representing correlations between the set of biosignals and the set of target emotions. Generally, in Block S130, the computer system can: identify biosignal patterns, in the set of biosignals, correlated with instances of target emotions; and generate the set of psychophysiological markers, based on the biosignal patterns. In one example, the set of psychophysiological markers can include biosignal patterns, such as a particular range of body temperatures occurring within a time period, a heart rate variability exceeding a threshold, or an inverse correlation between the body temperature and electrodermal activity occurring over a particular duration. Therefore, the computer system can generate the set of psychophysiological markers—that link biosignal patterns to target emotions associated with the condition—based on the voice recording and the corresponding set of biosignals.

In one implementation, the computer system can identify psychophysiological markers based on the voice recording and store the psychophysiological markers in a library of psychophysiological markers for later identification of the target emotions based on biosignal data. More specifically, the computer system can, for each user in the user population: record the voice recording of the user reciting the story; identify a segment of the voice recording representing a first target emotion in the set of target emotions; and identify a first subset of biosignals corresponding to the segment of the voice recording. Then, the computer system can generate the set of psychophysiological markers by: based on the first subset of biosignals, generating a first psychophysiological marker characterizing the first subset of biosignals; linking the first psychophysiological marker to the first target emotion; and writing the first psychophysiological marker to a library of psychophysiological markers. Then, during a second time period succeeding the first time period, the computer system can: access first series of biosignals of a first user; identify a second subset of biosignals corresponding to a second psychophysiological marker; match the second psychophysiological marker to the first psychophysiological marker, in the library of psychophysiological markers; and, in response to matching the second psychophysiological marker to the first psychophysiological marker, detect an instance of the first target emotion of the first user.

Therefore, the computer system can generate the set of psychophysiological markers representing patterns of biosignals correlated with instances of the target emotions based on: the voice recording, which represents instances of target emotions; and the corresponding set of biosignals. The computer system can then store the set of psychophysiological markers in a library of psychophysiological markers. Then, during a subsequent time period, the computer system can identify the target emotion exhibited by the first user based on presence of psychophysiological markers—in the first series of biosignals of the first user—that match (or approximate, such as within +/−5%) the psychophysiological markers stored in the library and associated with the target emotion.

In one implementation, the computer system can generate the set of psychophysiological markers representing correlations between physiological states (e.g., aroused, alert, stressed, fatigued) of a user, associated with certain biosignal patterns, and psychological states (angry, sad, happy, anxious, scared) of the user, associated with target emotions. In addition, the computer system can generate the set of psychophysiological markers representing patterns in the user's physical activity level (e.g., derived based on GPS and/or accelerometer data accessed from the user's mobile device and/or the wearable device), social activity level (e.g., derived from the user's voice, video, and/or text data accessed from the mobile device), and self-evaluations (e.g., mood journal entries and questionnaire responses provided by the user via the mobile device), each of which are correlated with the psychological states of the user.

3.3.1 Emotion Model Generation

In one implementation, the computer system can: identify psychophysiological markers in the set of biosignals based on the voice recording; and generate an emotion model for identifying instances of the target emotions based on the biosignals based on these psychophysiological markers. More specifically, the computer system can: generate the set of psychophysiological markers by: accessing a first timeseries of a first target emotion, in the set of target emotions, extracted from the voice recording; labeling the set of biosignals according to the first timeseries of the first target emotion to generate a first emotion-labeled series of biosignals; based on the first emotion-labeled series of biosignals, generating a subset of psychophysiological markers, in the set of psychophysiological markers, representing correlations between the set of biosignals and the first target emotion; and generating a first emotion model for predicting the first target emotion based on the biosignals based on the correlations.

Then, during a second time period succeeding the first time period, the computer system can: access a first series of biosignals of a first user; and identify the first series of psychophysiological markers representing a subset of instances of the first target emotion of the user based on the first emotion model and the first series of biosignals. Therefore, the computer system can: based on the voice recording representing instances of the target emotions and the corresponding set of biosignals, generate the set of psychophysiological markers representing patterns of biosignals correlated with instances of the target emotions; and generate the first emotion model for the first target emotion configured to identify instances of the first target emotion based on biosignals of the user. Thus, at a subsequent time, the computer system can deploy the first emotion model to identify the target emotions of the first user based on the first series of biosignals of the first user.

In one implementation, the computer system can generate the first timeseries of the first target emotion by: extracting pitch data, voice speed data, voice volume data, and pure tone data from the voice recording; deriving a set of instances of the first target emotion, from the pitch data, the voice speed data, the voice volume data, and the pure tone data; and labeling each instance of the first target emotion, in the subset of instances of the first target emotion, with an emotion marker timestamped according to a time of occurrence of the instance of the first target emotion in the voice recording. Therefore, the computer system can: based on characteristics of the voice of the user, such as pitch, voice speed, voice volume, and voice tone, detect the set of instances of the first target emotion in the voice recording; identify a time of occurrence of each instance of the first target emotion in the set of instances; and generate the first timeseries of the first target emotion corresponding to the voice recording. The computer system can then correlate each instance of the first target emotion in the first timeseries of the first target emotion with biosignal patterns present in the corresponding set of biosignals to generate the psychophysiological markers associated with the first target emotion.

In one implementation, the computer system can generate the first emotion-labeled timeseries of biosignal data as described above; implement regression, artificial intelligence, machine learning, deep learning, and/or other techniques to derive links or correlations between these physiological biosignals and instances of the target emotion for the user; and generate a user-specific emotion model to accurately recognize when the user is experiencing an instance of the target emotion (e.g., a happy, sad, stressed, or distressed emotional event) based on biosignal data alone. In one implementation, the system can access the first emotion-labeled timeseries of biosignal data; identify a first instance of the first target emotion in the first emotion-labeled timeseries of biosignal data; assign a confidence score to the first instance of the first target emotion; and—if the confidence score for the first instance of the first target emotion is above a minimum confidence score (e.g., 75%)—add the first instance of the first target emotion to the emotion model. The system can assign confidence scores for the remaining instances of the first target emotion to build the emotion model only with instances above the minimum confidence score, such that the emotion model only contains a minimum amount of data to accurately predict instances of the target emotion, which can then be stored locally on the wearable device (and/or stored remotely on the mobile device or the remote computer system).

Figure 10:
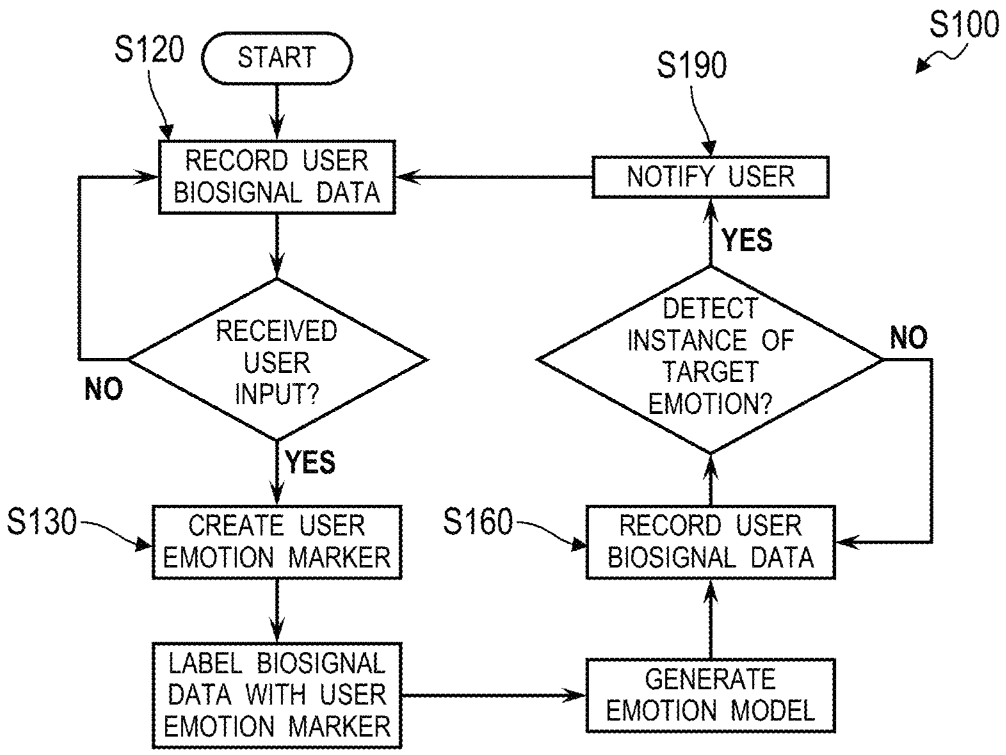
FIG. 10 is a flowchart representation of one variation of the method.

In one implementation, shown in FIG. 10, the computer system can: record a first timeseries of biosignal data via a set of sensors integrated into a wearable device worn by the user; in response to receiving input from the user indicating an instance of a target emotion, create a user emotion marker; label the first timeseries of biosignal data according to the user emotion marker to generate an emotion-labeled time series of biosignal data; generate an emotion model linking biosignals to user emotion markers for the user based on the first emotion-labeled timeseries of biosignal data; and—during a second period of time succeeding the first period of time—record a second timeseries of biosignal data via the set of sensors integrated into the wearable device worn by the user; detect a second instance of the first target emotion exhibited by the user based on the second timeseries of biosignal data and the emotion model.

3.3.2 Multimodal Data

In one implementation, the computer system can generate the set of psychophysiological markers associated with the set of target emotions or with the condition based on multimodal data of each user in the user population. In this implementation, during the first time period, in addition to accessing the set of biosignals collected by the wearable device of each user in the user population, the computer system can access a set of multimodal data of each user in the user population, the set of multimodal data including: sleep data (e.g., user's sleep duration, number and duration REM cycles), motion data (e.g., number of steps walked, duration of daily exercise), social activity data (e.g., frequency of text or voice communications via the mobile device), and/or language/communication data (e.g., keywords used in text communications) of the of the user. In this implementation, the computer system can access the set of multimodal data from a set of integrated sensors of the wearable device worn by each user in the user population or from the memory of a mobile device of each user in user population. Generally, during the first time period, the computer system can: identify patterns associated with the condition in these multimodal data; identify patterns associated with the target emotions associated with the condition in these multimodal data; and generate corresponding psychophysiological markers based on these patterns. Then, in response to identifying these corresponding psychophysiological markers in a second set of multimodal data of the first user collected during a subsequent time period, the computer system can predict the risk of presentation of the condition symptoms. For example, the computer system can link daily sleep duration in a range of 10-15 hours to a condition, such as clinical depression. For example, the computer system can link to a set of keywords (e.g., good, sunshine, success), present in text or verbal communications of the user, to a target emotion, such as happiness. Then, in response to detecting a daily sleep duration of the first user in a range of 10-15 hours, as well as other psychophysiological markers associated with clinical depression, the computer system can calculate a risk score of presentation of depression symptoms above a certain threshold, indicating an increased risk.

In one implementation, the computer system can additionally or alternatively derive psychophysiological markers based on motion data, of each user in the user population, collected over a nominal time period. In this implementation, during the first time period, the computer system can access a set of motion data of each user in the user population. In one example, the computer system can access motion data recorded by the mobile device of the user over a time period overlapping with instances of the set of target emotions, such as during recitation of the story. In another example, the computer system can access motion data recorded by the mobile device of the user over a nominal period of time, such as a week, following diagnoses of the user with the condition. The computer system can then generate the set of psychophysiological markers representing correlations between the set of target emotions associated with the condition and the set of motion data. For example, the computer system can link sudden bursts of movement, indicated by the motion data, to anger. Therefore, based on sets of correlations between the psychophysiological markers and the clinical assessments for the condition, the computer system can generate the condition model, which accounts for correlations between the clinical assessments and the motion data and correlations between the clinical assessments and the biosignals.

In another example, the computer system can additionally derive psychophysiological markers based on language data, such as text communications, of each user in the user population, collected over a nominal time period. More specifically, during the first time period, the computer system can: access a set of text communications generated by each user in the user population; and extract a set of language signals, such as a set of keywords, from the first set of text communications. In one example, the computer system can access text communications stored via the mobile device of the user over a nominal period of time, such as a week, following diagnoses of the user with the condition. Then, the computer system can generate the set of psychophysiological markers representing the correlations between the set of target emotions and the set of language signals. For example, the computer system can link certain keywords in the set of language signals to certain target emotions. Therefore, based on sets of correlations between the psychophysiological markers and the clinical assessments for the condition, the computer system can generate the condition model, which accounts for correlations between the clinical assessments and the text communications and correlations between the clinical assessments and the biosignals.

In one implementation, the computer system can apply a model (e.g., sleep model, mental stress model, fatigue model) to transform the set of biosignal data, representative of the psychomotor activity, body energy, sleep duration and quality, respiratory rate, and/or autonomic nervous system responsiveness, into the set of psychophysiological markers representing sleep quality, periods of fatigue, and anxiety indicators exhibited by the user in the user population. In particular, the computer system can implement methods and techniques described below and in U.S. patent application Ser. No. 16/460,105 and U.S. patent application Ser. No. 18/126,100, each of which is incorporated herein by reference, to construct individualized models for transforming biosignal data into emotions for each user in this user population. Therefore, the computer system can transform the biosignal data of each user in the user population into a set of psychophysiological markers indicative of the emotional, mental, and physiological health of each user in the user population.

3.4 Population Clinical Assessment Collection

Block S140 of the method S100 recites: accessing a clinical assessment for the condition in the user, wherein the clinical assessment represents condition symptoms in the user. Generally, in Block S140, the computer system can: access the clinical assessment for the condition of the user, the clinical assessment representing condition symptoms experienced by the user. Thus, the computer system can: correlate the set of psychophysiological markers, linked to the set of target emotions associated with the condition, to the clinical assessment; and generate the condition model configured to predict risk of the condition symptoms based on the correlations.

In one implementation, the computer system can identify patterns between the clinical assessments for condition of each user in the user population and the set of psychophysiological markers of the user. Based on these patterns, the computer system can predict clinical assessments for a new user (e.g., user not in the user population) based on the data (e.g., biosignal data, motion data, psychophysiological markers, language signals) of the new user.

In one implementation, the computer system can access the clinical assessment for condition of each user in the user population by: prompting the care provider to recount the clinical appearance, emotional state, and mental state of the user; and receiving a textual description of the clinical appearance, emotional state, and mental state of the user from the care provider. For example, the computer system can prompt the care provider to recount the mental state of the user following an appointment between the user in the user population and the care provider. In particular, the computer system can: provide the care provider with a text input box via a user interface of a device of the care provider; and receive the textual description of the mental state of the user via the text input box. Additionally, or alternatively, the computer system can prompt the care provider to rate the state (e.g., mental state, emotional awareness, appearance, compliance) of the first user on a rating scale following the appointment. In particular, the computer system can access the clinical assessment for condition for each user in the user population by: prompting the care provider to provide a set of scores (e.g., metrics, questionnaire responses, quantitative measures) representing the mental state of the user; and receive the set of scores (representing the mental state of the user from the care provider. Therefore, the computer system can access the clinical assessment for condition of each user in the user population, wherein the clinical assessment includes a written description and/or a quantitative evaluation of the emotional state of the user provided by the care provider.

In one implementation, the computer system can access the clinical assessment of a user in the user population by: prompting the care provider to recount mental state of the user (e.g., following an appointment between the user and the care provider); receiving a textual description of mental state of the user from the care provider; and extracting a second set of language signals from the textual description of the mental state of the user. In one example, the set of language signals can include a signal embedding (e.g., vector) representing the meaning of the textual description. In this implementation, the computer system can derive the set of correlations between the set of psychophysiological markers and the clinical assessment for condition by deriving the set of correlations between the set of psychophysiological markers and the second set of language signals. In the example, the computer system can: transform the set of psychophysiological markers into a second embedding representing condition symptoms of the user; and apply a transformer deep neural network architecture to derive the set of correlations between the embedding and the second embedding. Therefore, the computer system can apply a transformer deep neural network architecture to: transform the clinical assessment and the set of psychophysiological markers of the user into vector representations; and based on these vector representations, correlate the clinical assessment of a user and the set of psychophysiological markers.

3.5 Condition Model Generation

Generally, Blocks S150 and S155 of the method S100 recite: deriving a set of correlations between the set of psychophysiological markers and the clinical assessment for the condition of each user in the user population; and compiling sets of correlations, derived for the user population, into a condition model configured to predict risk of the condition symptoms based on psychophysiological markers. Generally, in Blocks S150 and S155, the computer system can: correlate sets of psychophysiological markers and the corresponding clinical assessments for the condition of users diagnosed with the condition; and compile the correlations between clinical assessments and sets of psychophysiological markers into the condition model configured to predict a risk of presentation of the condition symptoms by a user. For example, the condition model can predict a risk of condition diagnosis (e.g., relapse or onset) of the user. Therefore, based on the audio recording or the story, the set of biosignals, and the clinical assessments for the condition, the computer system can: generate the condition model; and deploy the condition model to predict the risk of presentation of the condition symptoms in a user not previously diagnosed with the condition.

In one implementation, during the first time period, the computer system can: access a set of text communications generated by each user in the user population; and extract a set of language signals from the set of text communications. In this implementation, the computer system can further derive the set of correlations between the set of language signals and the clinical assessment for condition. Accordingly, the computer system can identify patterns between the clinical assessment for condition of the user in the user population and text data (or voice data), representative of the social activity level of the user, collected from the mobile device of the user in the user population. Based on these patterns, the computer system can predict a clinical assessment for condition of a new user (e.g., a user not in the user population) from a set of text communications obtained from a mobile device of the new user.

3.6 Condition Model Refinement

In one implementation, during the first time period, the computer system can, for each user in the user population: access a set of self-assessments of condition symptoms generated by the user; and extract a series of condition symptom severities from the set of self-assessments. For example, the computer system can access questionnaire responses (e.g., PHQ-9 responses, GAD-7 responses, etc.) that reflect depressive symptom and anxiety symptom severity of each user in the user population.

Then, the computer system can derive the set of correlations further between: the set of psychophysiological markers and the series of condition symptom severities; and the set of motion data and the series of condition symptom severities. Additionally, or alternatively, the computer system can derive the set of correlations further between: the set of biosignal data and the series of condition symptom severities; the set of motion data and the series of condition symptom severities; and/or the set of language signals and the series of condition symptom severities. Generally, the computer system can derive the set of correlations between the condition symptom severities and various types of user data, such as the set psychophysiological markers, the set of motion data, the set of biosignal data, and/or the set of language signals. Accordingly, the computer system can identify patterns between the series of condition symptom severities, obtained from self-assessments, of a user in the user population and data of the user such as the set psychophysiological markers, the set of motion data, the set of biosignal data, the set of language signals. Based on these patterns, the computer system can predict changes in symptom severity of the user in the user population from text data, biosignal data, and/or motion data. For example, the condition model can predict risk of future symptom severity of the condition.

In this implementation, the computer system can fine-tune the condition model to predict risk of future condition diagnosis and future condition symptom severity based on historical psychophysiological markers and historical motion data. In particular, the computer system can incorporate the set of correlations (e.g., correlations between the series of condition symptom severities and the set of psychophysiological markers, the first set of motion data, and/or the set of biosignal data) into the condition model.

In one implementation, the computer system can: access a first subset of biosignals of a user; convert the first subset of biosignals of the user into a first emotion; in response to the first emotion of the user including a target emotion, prompt the user to supply a first current personal condition symptom severity; and store the first current personal condition symptom severity in a first self-assessment in the set of self-assessments. Then, the computer system can: extract a first condition symptom severity, in the series of condition symptom severities, from the first self-assessment. Therefore, the computer system can prompt the user in the user population to respond to a questionnaire (e.g., PHQ-9) of condition symptom severity in response to detecting the first emotion (e.g., sadness) based on the subset of biosignal.

In one example, the computer system can prompt the user to respond to a set of prompts by rating condition symptom severity on a rating scale and receiving the self-assessment from the user, the self-assessment including a set of ratings of condition symptom severity according to the rating scale. Then, the computer system can extract a condition symptom severity score in the series of condition symptom severities from the self-assessment in the set of self-assessments by calculating the condition symptom severity score, in the set of condition symptom severities, based on the set of ratings of condition symptom severity corresponding to the self-assessment. In one example, the computer system can add the set of ratings of condition system severity associated with the self-assessment to yield the condition symptom severity score.

4. Condition Model Deployment

Generally, during a second time period succeeding the first time period, the computer system can deploy the condition model to calculate the risk of a first user developing condition symptoms by: accessing a first series of biosignals from a wearable device worn by the first user; identifying a first series of psychophysiological markers in the first series of biosignals, the first series of psychophysiological markers representing a first set of instances of the set of target emotions associated with the condition; and injecting a first series of psychophysiological markers into the condition model to calculate a risk score of presentation of the condition symptoms by the first user. Therefore, the computer system can: identify psychophysiological markers of the set of emotions, such as sadness, associated with a condition, in the first series of biosignal data; and, based on the psychophysiological markers and the condition model, trained on biosignal data of the user population and corresponding clinical assessments for the condition, predict a risk of presentation of the condition symptoms in the user. Then, in response to the first risk score exceeding a threshold risk, the computer system can: generate a notification specifying an action protocol associated with the condition; and serve the notification to the first user.

4.1 Biosignal Data Collection for Individual User

Block S160 of the method S100 recites: during a second time period succeeding the first time period, accessing a first series of biosignals collected by a first wearable device worn by a first user. Generally, in Block S160, the computer system can access the first series of biosignals of the first user to be evaluated, via the condition model, for the risk of presentation of the condition symptoms.

In one implementation, the computer system can assess the series of biosignal data collected by a set of sensors embedded in the wearable device worn by a first user, the series of biosignal data including electrodermal activity data, heart rate data, heart rate variability data; skin temperature data; and inertial measurement unit data.

4.2 Marker Generation for Individual User

Block S170 of the method S100 recites: identifying a first series of psychophysiological markers in the first series of biosignals, the first series of psychophysiological markers representing a first set of instances of the set of target emotions associated with the condition. Generally, in Block S116, the computer system can transform the first series of biosignal data, such as heart rate variability, skin temperature, respiratory rate, into the first series of psychophysiological markers, including patterns of biomarkers, representing instances of target emotions. Therefore, based on the first series of psychophysiological markers, derived from the first series of biosignals, the computer system can predict the risk score of presentation of the condition symptoms by the first user.

In one implementation, the computer system can: prompt the first user to provide a second voice recording; record the second voice recording of the first user; extract a second set of instances of the set of target emotions from the second voice recording; and identify the first series of psychophysiological markers based on the first series of biosignals and the second voice recording. In this implementation, the computer system can identify the first series of psychophysiological markers representing: biosignal patterns associated with the condition; and patterns of pitch, tone, speed and volume of the voice of the first user in the second voice recording, the patterns associated with the condition and the second set of instances of the set of target emotions. Thus, the computer system can transform the first series of biosignals and the second voice recording into the first series of psychophysiological markers. Therefore, the computer system can predict the risk of condition relapse or onset based on the first series of biosignals and the second voice recording collected during the second time period.

In one example, the computer system can: prompt the user to orally describe a set of images presented to the user (e.g., via the mobile device); record the second voice recording of the description of the set of images provided by the user; and extract instances of the target emotions associated with the condition from the second voice recording. In another example the computer system can prompt the user to orally respond to a prompt (e.g., "how was your day?" or "are you excited about the upcoming weekend?"); record the second voice recording of the user responding to the prompt; and extract instances of the target emotions associated with the condition from the second voice recording. In in yet another example, the computer system can: display a written story to the user via a mobile device; prompt the user to orally recite the written story; record the second voice recording of the written story recited by the user; and extract instances of the target emotions associated with the condition from the second voice recording. Therefore, by prompting the user to provide the second voice recording, the computer system can identify emotions currently experienced by the user. The computer system can then: extract the first series of psychophysiological markers based on the current emotions experienced by the user and the first series of biosignal data; and leverage the psychophysiological markers to assess the risk of presentation of condition symptoms by the user.

In one implementation, the computer system can identify the first series of psychophysiological markers based on a first series of multimodal data, such as sleep data (e.g., user's sleep duration, number and duration REM cycles), motion data (e.g., number of steps walked, duration of daily exercise), social activity data (e.g., frequency of text or voice communications via the mobile device), and language/communication data (e.g., keywords used in text communications) of the of the first user. In this implementation, the computer system can access the first series of multimodal data from the set of integrated sensors of the wearable device worn by the first user or from the memory of the mobile device of the first user. Generally, during an initial time period, the computer system can: identify patterns associated with the condition in these data; identify patterns associated with the target emotions associated with the condition in these data; and, based on these patterns, generate corresponding psychophysiological markers.

Then, in response to identifying these corresponding psychophysiological markers in a second set of multimodal data of the first user collected during a subsequent time period, predict the risk of presentation of the condition symptoms. For example, the computer system can link to daily sleep duration in a range of 10-15 hours to a condition, such as clinical depression. For example, the computer system can link to a set of keywords (e.g., good, sunshine, success), present in text or verbal communications of the user, to a target emotion, such as happiness. Then, in response to detecting a daily sleep duration of the first user in a range of 10-15 hours, as well as other psychophysiological markers associated with clinical depression, the computer system can calculate a risk score of presentation of depression symptoms above a certain threshold, indicating an increased risk.

In one implementation, during the second time period, the computer system can monitor the emotional state of the first user and the risk of presence of the condition symptoms in the first user based on biosignal data and motion data of the first user. In this implementation, during the second time period, in addition to accessing the first series of biosignals collected by the wearable device, the computer system can access a first series of motion data of the first user. In one example the first series of motion data can include motion data: collected by the internal measurement unit of the first wearable device worn by the first user; and indicating the daily amount of physical activity of the first user. In another example, the first series of motion data can include motion data: collected by the global positioning system (GPS) of the mobile device of the first user; and indicating the daily amount of travel that the user undergoes. Based on the first series of motion data, the computer system can then identify the first series of psychophysiological markers in the first series of motion data, the first series of psychophysiological markers representing patterns in motion data indicative of the set of target emotions experienced by the user.

For example, the computer system can identify: a first psychophysiological marker, in the first series of psychophysiological markers, representing a cumulative period of daytime inactivity (e.g., no movement during daytime) within a first time range (e.g., 8-10 hours) representing a first target emotion (e.g., sadness); and a second psychophysiological marker, in the first series of psychophysiological markers, representing a first distance range (e.g., 1-5 miles), walked by the first user representing a second target emotion associated with a positive outlook. Then, the computer system can deploy the condition model to predict the risk of presentation of the condition symptoms by the first user based on the first set of psychophysiological markers. Therefore, the computer system can deploy the condition model to predict the risk of presentation of the condition symptoms based on both motion data of the first user and biosignal data of the first user.

In one implementation, the computer system can monitor the emotional state of the first user and risk of presence of the condition symptoms in the first user based on biosignal data and text communications of the first user. In this implementation, during the second time period, in addition to accessing the first series of biosignals collected by the wearable device, the computer system can access a first series of text communications generated by the first user and extract a first series set of language signals from the first series of text communications. Then, the computer system can identify the first series of psychophysiological markers in the first series set of language signals. For example, the computer system can identify: a first psychophysiological marker, representing a first set of keywords, generated by the first user, associated with a first target emotion in the set of target emotions; and a second psychophysiological marker representing a second set of keywords, generated by the first user, associated with a second target emotion in the set of target emotions. Therefore, the computer system can deploy the condition model to predict the risk of presentation of the condition symptoms based on both communication data (e.g., text communications, voice communications) of the first user and biosignal data of the first user.

4.2.1 Emotion Model Deployment

In one implementation, the computer system can apply a model (e.g., emotion model, sleep model, mental stress model, fatigue model) to transform the first series of biosignal data and or the first series of multimodal data into the first series of psychophysiological markers representing instances of the target emotions associated with the condition. More specifically, the computer system can: access the first emotion model associated with the first target emotion; and, based on the first emotion model and the first series of biosignals, identify the first series of psychophysiological markers representing a subset of instances of the first target emotion.

In one implementation, the computer system can update the first emotion model in response to the first user confirming or denying an instance of the target emotion identified by the first emotion model in the first series of biosignals. In this implementation, during a third time period succeeding the second time period, the computer system can: access a second series of biosignals collected by the first wearable device; identify a second psychophysiological marker representing a second instance of the first target emotion based on the first emotion model and the second series of biosignals; and, in response to detecting the second instance of the first target emotion, prompt the first user to confirm the second instance of the first target emotion. Then, in response to the user denying the second instance of the first target emotion, the computer system can: label the second psychophysiological marker as not associated with the first target emotion; and update the first emotion model to disassociate the second psychophysiological marker from the first target emotion. Therefore, after deploying the first emotion model to detect an instance of the target emotion based on a series of biosignals, the computer system can prompt the first user to confirm the target emotion; and update the first emotion model accordingly.

4.3 Risk Calculation

Block S130 of the method S100 recites, based on the first series of psychophysiological markers and the condition model, calculating a first risk score of presentation of the condition symptoms by the first user. Generally, in Block S130, the computer system can: calculate the risk score of the first user developing condition symptoms based on the first set of instances of target emotions experienced by the first user during the second time period. Therefore, the computer system can deploy the condition model to predict an onset or a relapse of the condition based on biosignals of the first user, tracked by the first wearable device of the first user. Furthermore, the computer system can apply the condition model, trained on biosignal data from the user population diagnosed with the condition, to predict onset of the condition in a user not previously diagnosed with the condition.

In one implementation, during the second time period, the computer system can: access a target time window; and calculate the first risk score of presentation of the condition symptoms by the first user within the target time window based on the first series of psychophysiological markers and the condition model. For example, the computer system can input the target time window as an input parameter into the condition model, prior to executing the condition model to output the risk. Therefore, the computer system can deploy the condition model to calculate the risk of onset or relapse of the condition in the first user within a specified period of time, such as week or a month.

In one implementation, for a user previously diagnosed with the condition, the computer system can select the target time window by setting the target time window based on: historic responsiveness of the first user to the pharmacological medication (e.g., antidepressant medication); and anticipated effective period of the first dose of the pharmacological medication currently prescribed to the first user. In particular, the computer system can select the target time window inversely correlated with the historic responsiveness to the pharmacological medication and directly correlated with the effective period. For example, in response to the responsiveness of the first user to the pharmacological medication falling below a responsiveness threshold, the computer system can select a target time window falling below a threshold duration, to detect possible onset of the condition sooner. Additionally, or alternatively, the computer system can set the target time window based on the responsiveness of the care provider of the first user to receiving the notification. More specifically, the computer system can set the target time window inversely proportional to the responsiveness of the care provider.

In one implementation, the computer system can: access a threshold condition symptom severity; and, prior to presentation by the first user of condition symptom severity greater than the threshold condition symptom severity, calculate the first risk score representing presentation of the set of condition symptoms, approximating the threshold condition symptom severity, by the first user within the target time window. Therefore, the computer system can define the set of condition symptoms based on the threshold condition symptom severity (e.g., minimum severity of a set of condition symptoms attributable to condition) and calculate the first risk score representing presentation of the set of condition symptoms, approximating the threshold condition symptom severity.

In one implementation, during the second time period, the computer system can: access a risk threshold; and, based on the first series of psychophysiological markers and the condition model, calculate a first time associated with a risk of presentation of the symptoms by the first user, the risk exceeding the risk threshold prior to presentation of the condition symptoms by the first user. For example, the computer system can input the risk threshold as an input parameter into the condition model, prior to executing the condition model to output the first time when the risk of presentation of the condition symptoms first exceeds the risk threshold. Therefore, the computer system can deploy the condition model to calculate the first time when the risk of presentation of the symptoms exceeds a certain risk threshold. Then, based on the first time, the computer system can calculate a time duration between a current time and the first time; and, in response to the time duration falling below a threshold duration, notify the first user or the care provider of the first user, as described in the next section.

In one implementation, the computer system can: access the risk threshold; and, prior to presentation by the first user of the set of condition symptoms, calculate the first time associated with the risk of presentation by the first user of the set of condition symptoms exceeding the risk threshold based on the first series of psychophysiological markers, the first series of biosignal data, the first series of motion data, the first series of language signals, and/or a series of other data. Therefore, the computer system can calculate the first time duration to threshold risk based on various types of data collected from the first user.

In one implementation, the computer system can calculate the first time duration by calculating the first time associated with risk of presentation by the first user of the set of condition symptoms exceeding the relapse risk threshold, the set of condition symptoms: indiscernible to a nominal practicing physician during the first time duration; and visible to the nominal practicing physician after the first time.

4.4. Notification Generation

In one variation, Blocks S190 and S195 of the method S100 recite, in response to the first risk score exceeding the threshold risk: generating a notification specifying an action protocol associated with the condition; and serving the notification to the first user. In a similar variation, Blocks S190 and S195 of the method recite, in response to the first risk score exceeding the threshold risk: generating a notification specifying an action protocol associated with the condition; and serving the notification to the first user.

Generally, in response to detecting that the risk of presentation of the condition symptoms by the first user exceeds a certain threshold, the computer system can: notify the first user or the care provider of the first user; and specify the action protocol for prevention of the symptoms of the first condition in Blocks S190 and S195. For example, computer system can serve the action protocol intended to reduce frequency or intensity of the target emotions, associated with the condition, experienced by the first user. Alternatively, the computer system can serve the action protocol, such as a suggestion to prescribe a pharmacological medication or therapy to the user, to the care provider. Therefore, in response to detecting that the risk of presentation of the condition symptoms by the first user exceeds a certain threshold, the computer system can serve the action protocol for preventing or delaying the onset of the condition symptoms to the first user.

In one implementation, in response to the first risk score exceeding a threshold risk score, the computer system can: access the action protocol associated with the set of target emotions, the action protocol including a series of coaching activities (e.g., a breathing exercise, a mood diary, cognitive and behavioral exercises) to alter an emotional state of the first user; and prompt the first user to complete the action protocol via the mobile device of the first user. More specifically, the computer system can serve the series of coaching activities for altering the set of target emotions, associated with the condition, experienced by the first user to reduce the risk of the onset of the condition in the user. Therefore, the computer system can: detect an increase in the set of target emotions, associated with the condition, experienced by the first user; and, in order to reduce the risk of presentation of the condition symptoms, prompt the first user to complete the action protocol designed to alter or reduce the set of target emotions, associated with the condition, experienced by the user.

In one example, the computer system can: access the set of sensors on the wearable device; detect an instance of a distress emotion exhibited by the user; send a signal to the user by vibrating the wearable device; access a stress coaching activity generated for the user; and prompt the user via the mobile device to begin a breathing coaching activity to help the user regulate the stress emotional state and to reduce the risk of the onset or relapse of the condition.

In one implementation, the wearable device can continue to monitor the biosignals of the first user and send a signal to the first user once the first user's physiological biosignals indicate the instance of the target emotion has ended. The system can record an effectiveness value for each of the coaching activities for the target emotion based on the time elapsed from the start of the coaching activity to the end of the instance of the target emotion and either promote or remove particular coaching activities based on the efficacy of each coaching activity (e.g., a coaching activity associated with a shorter elapsed time to the end of the instance of the target emotion can be served to the user more often).

The system can also record a success rate for a coaching activity for the target emotion based on the average time elapsed from the start of the coaching activity to the end of the instance of the target emotion. The system can remove a coaching activity from the emotion model for the user if the coaching activity falls below a certain success rate (e.g., below a 50% success rate).

In one implementation, in response to the first risk score exceeding a threshold risk, the computer system can: access a previously-prescribed dose of a pharmacological medication to treat the condition in the first user; generate the notification specifying the action protocol including a prompt to resume consumption of the pharmacological medication; populate the notification with an indication of renewed prescription of the previously-prescribed dose of the pharmacological medication; and serve the notification to the first user. Then, upon receiving the notification via the companion application, the first user may resume consumption of the previously-prescribed dose of the pharmacological medication to mitigate the risk of relapse of the condition. Therefore, the computer system can: detect an increase in the set of target emotions, associated with the condition, experienced by the first user; and, in order to reduce risk of future presentation of the condition symptoms, automatically renew prescription of the pharmacological medication to the first user and prompt the first user to resume consumption of the pharmacological medication.

In one implementation, in response to the first risk score exceeding a threshold risk, the computer system can: generate a notification specifying the action protocol including a prompt to investigate the first user for prescription of a dose of the pharmacological medication that treats the condition; and serve the notification to the care provider of the first user. Then, the care provider may: contact the first user, evaluate the emotional state of the first user; and prescribe the dose of the pharmacological medication to the first user. Therefore, the computer system can: detect an increase in the set of target emotions, associated with the condition, experienced by the first user; and, in order to reduce the risk of presentation of the condition symptoms, notify the care provider of the first user of the worsening emotional state of the user.

In one implementation, in response to the first risk score exceeding a threshold risk, the computer system can select the action protocol (e.g., intervention, treatment), from a set of action protocols for the condition, based on the first series of psychophysiological markers. For example, in response to the first risk score exceeding the threshold risk, the computer system can access the set of action protocols for the condition, the set of action protocols including prescription of the pharmacological medication, scheduling of a cognitive behavioral therapy session, and/or assignment of a coaching activity or of another digital therapeutic intervention to the first user. Then, based on the first series of psychophysiological markers—including patterns of biosignal data, voice data (e.g., voice pitch, tone, volume in the second voice recording), and/or multimodal data linked to the set of target emotions and to the condition—select the action protocol. For example, in response to the first series of psychophysiological markers indicating that the first user is experiencing strong negative emotions, the computer system can select a coaching activity for handling strong negative emotions from the set of action protocols. In another example, in response to the first series of psychophysiological markers including biosignal patterns associated with onset of the condition symptoms, the computer system can select prescription of a pharmacological medication from the set of action protocols. In yet another example, in response to the first series of psychophysiological markers indicating that the first user is exhibiting certain thought and behavioral patterns associated with the condition, the computer system can select scheduling the cognitive behavioral therapy from the set of action protocols. Therefore, the computer system can leverage the psychophysiological markers to select an action protocol (e.g., treatment protocol) that is most appropriate for treating or mitigating the condition symptoms or emotions experienced by the first user.

In one implementation, in response to the first risk score exceeding the threshold risk, the computer system can: access user data of the first user from a user profile of the first user; and based on the user data, select the action protocol from the set of action protocols for the first user. In this implementation, the user data can include user characteristics (e.g., demographic information) of the first user, medical history of the first user, historical psychophysiological markers of the first user, and/or effectiveness of action protocols previously or currently assigned to the first user. In one example, the computer system can: detect that the first user is currently undergoing cognitive behavioral therapy based on the user profile; and assign a cognitive behavioral therapy session to the first user. In another example, based on the user profile, the computer system can: detect the that a certain coaching activity has previously prevented onset of the condition symptoms in the first user; and select the coaching activity for the first user. Therefore, the computer system can select a personalized action protocol for the first user based on the user data—such as characteristics of the first user, medical history of the first user, and/or effectiveness of action protocols previously or currently assigned to the first user—stored in the user profile of the first user.

In one implementation, the computer system can populate the notification with the first series psychophysiological markers and the series of motion data. Additionally, or alternatively, the computer system can further populate the notification with the first series of biomarkers, the first series of self-assessments, and/or the first series of language signals. Therefore, the computer system can populate the notification with the data of the first user collected during the second time period. The care provider may: review the data to confirm the first risk score; discuss this data with the first user during an appointment between the first user and the care provider; and apply this data to inform a treatment plan for the first user.

In one implementation, in response to the first risk score exceeding a threshold risk (or in response to the first time duration falling below threshold duration), the computer system can: populate a second notification with the first risk score (or the first time duration) and the first series of biomarkers, the first series of self-assessments, and/or the first series of language signals; and serve the second notification to the first user. Therefore, in response to the first risk score exceeding a threshold risk (or in response to the first time duration falling below a threshold duration), the computer system can notify the first user of the first risk score and present the first user with the data used to generate the first risk score.

In one implementation, serving the notification to the care provider can include: encrypting the notification; and transmitting the notification through an encrypted electronic messaging channel. Similarly, the computer system can encrypt the second notification sent to the first user and transmit the second notification through the encrypted electronic messaging channel. Accordingly, the computer system can encrypt notifications transmitted to the care provider or the first user, thereby ensuring privacy of the first user and protecting the first risk score, an identity of the first user, and the data of the first user (e.g., first series of biosignal) from access by third parties.

4.5 Example: Prescription Change

In one implementation, the computer system can access a first medical record of the first user, the first medical record specifying: a chronic condition diagnosis of the first user; and a current dose of the pharmacological medication prescribed to the first user. Then, in response to the first time duration (e.g., first time duration to the first time associated with a risk of presentation of the set of condition symptoms by the first user, the risk exceeding the risk threshold) falling below a target minimum duration between doses specified for the pharmacological medication, the computer system can populate the notification with the prompt to investigate the first user for prescription of the first dose of pharmacological medication exceeding the current dose of the pharmacological medication. Therefore, the computer system can prompt the care provider to adjust the dose of the pharmacological medication prescribed to the first user diagnosed with chronic condition in response to the first time duration falling below a target minimum duration between doses specified for the pharmacological medication, which can indicate a possible worsening of condition symptoms of the first user within the first time duration.

4.6 Example: Prescription Renewal

In one implementation, the computer system can access a first medical record of the first user, the first medical record indicating: episodic condition of the first user; and a previous dose of the pharmacological medication prescribed to the first user. In this implementation, in response to the first risk score exceeding a threshold risk, the computer system can populate the notification with the prompt to investigate the first user for renewal of prescription of the previous dose of the pharmacological medication. Therefore, the computer system can prompt the care provider to renew the prescription of the dose of the pharmacological medication for the first user diagnosed with episodic condition in response to the first risk score exceeding a threshold risk, which can indicate a possible condition relapse or onset within the target time window.

4.7 Example: Condition Diagnosis

In one implementation, the computer system can access a first medical record of the first user, the first medical record specifying non-clinically significant depressive anxiety symptoms of the first user. In this implementation, in response to absence of a current clinical condition diagnosis in the first medical record, the computer system can populate the notification with a second prompt to investigate the first user for a clinical condition diagnosis. Therefore, computer system can prompt the care provider to investigate the first user (e.g., the first user not diagnosed with condition but exhibiting depressive symptoms) for diagnosis with condition in response to the time duration falling below the threshold duration, which can indicate a worsening of the depressive symptoms of the first user.

4.8 Assessment of Action Protocol Effectiveness

In one implementation, the computer system can assess effectiveness of a particular action protocol assigned to the first user. In this implementation, during a third time period succeeding the second time period, the computer system can: access a second series of biosignals collected by the first wearable device worn by the first user; access a third voice recording of the first user; identify a second series of psychophysiological markers in the second series of biosignals and the third voice recording; based on the second series of psychophysiological markers and the condition model, calculate a second risk score of presentation of the condition symptoms by the first user; and calculate an effectiveness score for the action protocol currently or previously assigned to the first user, the effectiveness score inversely correlated with the second risk score. In addition, the computer system can store the effectiveness score linked to the action protocol in the user profile of the first user. Then, in response to the second risk score exceeding the threshold risk and in response to the effectiveness score falling below a threshold effectiveness, the computer system can: assign a second action protocol, different from the action protocol, to the first user; generate a second notification specifying the second action protocol for the condition; and serve the second notification to the care provider and/or the first user. Additionally, or alternatively, in response to the second risk score exceeding the threshold risk and in response to the effectiveness score exceeding the threshold effectiveness, the computer system can: re-assign the action protocol to the first user or maintain assignment of the action protocol to the first user; generate the second notification specifying the action protocol; and serve the second notification to the care provider and/or the first user. Therefore, the computer system can assess effectiveness of an action protocol assigned to the first user at a first time based on a risk of presentation of the condition symptoms calculated for the first user at a second (i.e., subsequent) time. The computer system can then either re-assign the action protocol to the first user if the action protocol has been effective or assign a new action protocol to the first user if the action protocol has not been effective. Thus, the computer system can: track the effectiveness of various action protocols assigned to the first user, identify which action protocols have historically been effective, and assign action protocols to the first user that are likely to be effective.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:

during a first time period:

for each user in a user population:

prompting the user to orally recite a story associated with a set of target emotions associated with a condition;

in response to detecting a voice of the user after prompting the user to orally recite the story, recording a set of biosignals via one or more sensors of a wearable device worn by the user, the set of biosignals being derived from physiological data of the user obtained from the one or more sensors;

generating, based on the physiological data of the user, a set of psychophysiological markers representing correlations between the set of biosignals and the set of target emotions;

accessing an electronic record of a clinical assessment for the condition in the user, the clinical assessment representing condition symptoms in the user; and deriving a set of correlations between the set of psychophysiological markers and the clinical assessment for the condition; and training, based on the set of correlations for each user in the user population, a condition model to identify, in biosignal data, patterns that are correlated with clinical assessments; and during a second time period:

accessing a first series of biosignals collected by a first wearable device worn by a first user, the first series of biosignals being derived from physiological data of the first user obtained from one or more sensors of the first wearable device;

identifying a first series of psychophysiological markers in the first series of biosignals, the first series of psychophysiological markers being correlated with a first set of instances of the set of target emotions associated with the condition;

calculating, by the condition model and based on the first series of psychophysiological markers, a first risk score of presentation of the condition symptoms by the first user; and in response to the first risk score exceeding a threshold risk:

generating a notification specifying an action protocol associated with the condition; and transmitting the notification to a device associated with the first user.

2. The method of claim 1, wherein prompting the user to orally recite the story comprises prompting the user to orally recite the story associated with the set of target emotions associated with the condition comprising a generalized anxiety disorder, the set of target emotions comprising restlessness and fear.

3. The method of claim 1:

wherein recording the set of biosignals comprises recording the set of biosignals via a set of sensors integrated into the wearable device, the set of biosignals comprising a skin moisture level, a heart rate variability, a body temperature, and an electrodermal activity level of the user;

wherein generating the set of psychophysiological markers comprises generating the set of psychophysiological markers comprising:

a first range of values of the skin moisture level and a second range of values of the heart rate variability associated with a first target emotion in the set of target emotions; and a third range of values of the body temperature and a fourth range of values of the electrodermal activity level associated with a second target emotion in the set of target emotions;

wherein accessing the first series of biosignals comprises accessing the first series of biosignals comprising the skin moisture level, the heart rate variability, the body temperature, and the electrodermal activity level of the first user;

wherein identifying the first series of psychophysiological markers in the first series of biosignals comprises:

identifying the first series of psychophysiological markers in the first series of biosignals, the first series of psychophysiological markers comprising:

a fifth range of values of the skin moisture level and a sixth range of values of the heart rate variability; and further comprising, in response to the fifth range of values of the skin moisture level falling within the first range of values and the sixth range of values of the heart rate variability falling within the second range of values, associating the first series of psychophysiological markers with the first target emotion.

4. The method of claim 1:

further comprising, for each user in the user population:

recording a voice recording of the user reciting the story;

identifying a segment of the voice recording representing a first target emotion in the set of target emotions;

identifying a first subset of biosignals the set of biosignals corresponding to the segment of the voice recording;

wherein generating the set of psychophysiological markers for each user in the user population comprises:

for each user in the user population:

based on the first subset of biosignals, generating a first psychophysiological marker characterizing the first subset of biosignals;

linking the first psychophysiological marker to the first target emotion; and writing the first psychophysiological marker to a library of psychophysiological markers; and wherein identifying the first series of psychophysiological markers in the first series of biosignals comprises:

identifying a second subset of biosignals, in the first series of biosignals, approximating the first psychophysiological marker, in the library of psychophysiological markers; and in response to identifying the second subset of biosignals characterized by the first psychophysiological marker, associating the second subset of biosignals with the first target emotion.

5. The method of claim 1:

wherein generating the set of psychophysiological markers for each user in the user population comprises:

for a user in the user population:

accessing a timeseries of a first target emotion, in the set of target emotions, extracted from a voice recording of the user reciting the story;

labeling the set of biosignals, recorded via a wearable device worn by the user, according to the timeseries of the first target emotion to generate an emotion-labeled series of biosignals; and based on the emotion-labeled series of biosignals, generating a subset of psychophysiological markers, in the set of psychophysiological markers, representing correspondence between the set of biosignals and the first target emotion; and based on correspondences between biosignals and the first target emotion within the user population, generating a first emotion model linking biosignals to the first target emotion within the user population; and wherein identifying the first series of psychophysiological markers in the first series of biosignals comprises:

based on the first emotion model and the first series of biosignals, identifying the first series of psychophysiological markers representing a first set of instances of the first target emotion.

6. The method of claim 5:

wherein accessing the first timeseries of the first target emotion for the user in the user population comprises:

extracting pitch data, voice speed data, voice volume data, and pure tone data from the voice recording;

detecting a set of instances of the first target emotion, from the pitch data, the voice speed data, the voice volume data, and the pure tone data; and for each instance of the first target emotion in the set of instances of the first target emotion:

labeling the instance of the first target emotion with an emotion marker timestamped according to a time of occurrence of the instance of the first target emotion in the voice recording.

7. The method of claim 5, further comprising:

at a third time period succeeding the second time period:

accessing a second series of biosignals collected by the first wearable device;

based on the first emotion model and the second series of biosignals, identifying a second psychophysiological marker representing a second instance of the first target emotion; and in response to detecting the second instance of the first target emotion, in the second set of instances:
prompting the first user to confirm the second instance of the first target emotion; and
in response to the user denying the second instance of the first target emotion:
labeling the second psychophysiological marker as not associated with the first target emotion; and
updating the first emotion model to disassociate the second psychophysiological marker from the first target emotion.

8. The method of claim 1:
wherein generating the notification specifying the action protocol associated with the condition comprises:
accessing the action protocol associated with the set of target emotions, the action protocol comprising a series of coaching activities to alter an emotional state of the first user; and
prompting the first user to complete the action protocol via the device.

9. The method of claim 1:
wherein generating the notification specifying the action protocol associated with the condition comprises:
accessing a previously-prescribed dose of a pharmacological medication to the first user to treat the condition;
generating the notification specifying the action protocol comprising a prompt to resume consumption of the pharmacological medication; and
populating the notification with an indication of renewed prescription of the previously-prescribed dose of the pharmacological medication.

10. The method of claim 1, wherein prompting the user to orally recite the story associated with the set of target emotions comprises prompting the user to orally recite a personal story associated with a user experience that elicits the set of target emotions.

11. The method of claim 1, wherein prompting the user to orally recite the story associated with the set of target emotions comprises:
displaying a written story to the user via a mobile device, the written story configured to elicit the set of target emotions; and
prompting the user to orally recite the written story.

12. The method of claim 1:
further comprising:
during the first time period:
for each user in the user population:
accessing a set of self-assessments of the condition symptoms, the set of self-assessments generated by the user; and
based on the set of self-assessments, extracting a set of symptom severities of the condition symptoms;
wherein deriving the set of correlations comprises deriving the set of correlations between the set of psychophysiological markers and the set of symptom severities;
wherein compiling the sets of correlations into the condition model comprises generating the condition model configured to predict the risk of future condition diagnosis and future symptom severity based on the psychophysiological markers;
further comprising, during the second time period, accessing a threshold symptom severity; and
wherein calculating the first risk score comprises:
prior to presentation of symptom severity, greater than the threshold symptom severity, by the first user:
calculating the first risk score representing presentation of the condition symptoms, approximating the threshold symptom severity, by the first user.

13. The method of claim 1:
further comprising, during a first time period:
for each user in the user population:
accessing a set of motion data of the user;
wherein generating the set of psychophysiological markers comprises:
generating the set of psychophysiological markers representing correlations between:
the set of target emotions;
the set of biosignals; and
the set of motion data;
further comprising, during the second time period:
accessing a first series of motion data of the first user; and
wherein identifying the first series of psychophysiological markers comprises:
identifying the first series of psychophysiological markers in the first series of biosignals and the first series of motion data, the first series of psychophysiological markers comprising:
a first psychophysiological marker representing a first range of distances, traveled by the first user, associated with a first target emotion in the set of target emotions; and
a second psychophysiological marker representing a second range of distances, traveled by the first user, associated with a second target emotion in the set of target emotions.

14. The method of claim 1:
further comprising, during the second time period, accessing a target time window; and
wherein calculating the first risk score comprises:
prior to presentation of the condition symptoms by the first user:
based on the first series of psychophysiological markers and the condition model, calculating the first risk score of the condition symptoms by the first user within the target time window.

15. The method of claim 1:
further comprising, during the second time period, accessing a risk threshold; and
wherein calculating the first risk score comprises:
prior to presentation of the condition symptoms by the first user:
based on the first series of psychophysiological markers and the condition model, calculating a first time associated with a risk of presentation of the condition symptoms by the first user, the risk exceeding the risk threshold; and
calculating a first time duration between the first time and a current time; and
wherein generating the notification specifying the action protocol comprises:
in response to the first time duration falling below a threshold duration, generating the notification specifying the action protocol.

16. A method comprising:
during a first time period:
for each user in a user population:
concurrently recording:

an audio recording of the user reciting a story associated with a target emotion associated with a condition; and a set of biosignals via one or more sensors of a wearable device worn by the user, the set of biosignals being derived from physiological data of the user obtained from the one or more sensors;

generating, based on the physiological data of the user, a set of psychophysiological markers representing correlations between the set of biosignals and the target emotion;

accessing an electronic record of a clinical assessment for the condition in the user, the clinical assessment representing condition symptoms in the user; and deriving a set of correlations between the set of psychophysiological markers and the clinical assessment for the condition; and training, based on the set of correlations for each user in the user population, a condition model to identify, in biosignal data, patterns that are correlated with clinical assessments; and during a second time period:

accessing a first series of biosignals collected by a first wearable device worn by a first user, the first series of biosignals being derived from physiological data of the first user obtained from one or more sensors of the first wearable device;

identifying a first series of psychophysiological markers in the first series of biosignals, the first series of psychophysiological markers being correlated with a first set of instances the target emotion associated with the condition;

calculating, by the condition model and based on the first series of psychophysiological markers, a first risk score of presentation of condition symptoms by the first user; and in response to the first risk score exceeding a threshold risk:

generating a notification specifying an action protocol associated with the condition; and transmitting the notification to a device associated with the first user.

17. The method of claim 16, wherein generating the notification comprises generating the notification specifying the action protocol comprising a prompt to investigate the first user for renewal of prescription of a dose of a pharmacological medication associated with the condition.

18. The method of claim 16:

wherein accessing the clinical assessment comprises:

for each user in the user population:

prompting a care provider to describe an emotional state of the user;

receiving a textual description of emotional state of the user from the care provider; and extracting a second set of language signals from the textual description of the emotional state of the user; and wherein deriving the set of correlations between the first set of psychophysiological markers and the clinical assessment comprises deriving the set of correlations between the first set of psychophysiological markers and the second set of language signals.

19. The method of claim 16:

further comprising, during the second time period, accessing a risk threshold; and wherein calculating the first risk score comprises:

prior to presentation of the condition symptoms by the first user:

based on the first series of psychophysiological markers and the condition model, calculating a first time associated with a risk of presentation of the condition symptoms by the first user, the risk exceeding the risk threshold; and calculating a first time duration between the first time and a current time; and wherein generating the notification specifying the action protocol comprises:

in response to the first time duration falling below a threshold duration, generating the notification specifying the action protocol.

20. A method comprising:

during a first time period:

prompting a first user to orally recite a story associated with a target emotion associated with a condition;

accessing a voice recording of the first user reciting the story, the voice recording being recorded in response to detecting a voice of the first user after prompting the first user to orally recite the story;

accessing a set of biosignals recorded during recitation of the story by the user, the set of biosignals being derived from physiological data of the user;

based on the voice recording, identifying a set of psychophysiological markers representing correlations between subsets of biosignals, in the set of biosignals, and the target emotion;

accessing an electronic record of a clinical assessment for the condition in the first user, the clinical assessment representing condition symptoms in the first user;

deriving a set of correlations between the set of psychophysiological markers and the clinical assessment for the condition; and training, based on the set of correlations, a condition model to predict risk of the condition symptoms based on psychophysiological markers of the first user; and during a second time period:

accessing a second set of biosignals of the first user, the second set of biosignals being derived from second physiological data of the first user recorded during the second time period;

in the second set of biosignals, identifying a first psychophysiological marker, in the set of psychophysiological markers, representing a first instance of the target emotion;

calculating, by the condition model and based on the first psychophysiological marker, a first risk score of presentation of condition symptoms by the first user; and in response to the first risk score exceeding a threshold risk:

generating a notification specifying an action protocol associated with the condition; and transmitting the notification to a device associated with the first user.

* * * * *